United States Patent
Kim et al.

(10) Patent No.: US 10,914,681 B2
(45) Date of Patent: Feb. 9, 2021

(54) FUNCTIONAL MATERIAL INCLUDING METAL-ORGANIC FRAMEWORK, METHOD OF PREPARING THE SAME, AND PHOTOCHEMICAL SENSOR INCLUDING THE SAME

(71) Applicants: Samsung Electronics Co., Ltd., Suwon-si (KR); OXFORD UNIVERSITY INNOVATION LIMITED, Oxford (GB)

(72) Inventors: Ha Jin Kim, Hwaseong-si (KR); In Taek Han, Seoul (KR); Abhijeet K. Chaudhari, Oxford (GB); Jin-Chong Tan, Oxford (GB)

(73) Assignees: Samsung Electronics Co., Ltd., Gyeonggi-do (KR); OXFORD UNIVERSITY INNOVATION LIMITED, Batley (GB)

( * ) Notice: Subject to any disclaimer, the term of this patent is extended or adjusted under 35 U.S.C. 154(b) by 535 days.

(21) Appl. No.: 15/656,115

(22) Filed: Jul. 21, 2017

(65) Prior Publication Data
US 2018/0024058 A1   Jan. 25, 2018

(30) Foreign Application Priority Data
Jul. 21, 2016   (KR) .................. 10-2016-0092846

(51) Int. Cl.
*G01N 21/64* (2006.01)
*C09K 11/06* (2006.01)
*C09K 11/02* (2006.01)

(52) U.S. Cl.
CPC .......... *G01N 21/643* (2013.01); *C09K 11/025* (2013.01); *C09K 11/06* (2013.01); *G01N 21/6447* (2013.01); *C09K 2211/1029* (2013.01); *C09K 2211/188* (2013.01); *G01N 2021/6439* (2013.01)

(58) Field of Classification Search
CPC ......... G01N 21/64; C09K 11/06; C09K 11/02
USPC ........................................ 436/106, 128, 139
See application file for complete search history.

(56) References Cited

U.S. PATENT DOCUMENTS

| 8,480,955 B2 | 7/2013 | Yaghi et al. |
| 2010/0072424 A1 | 3/2010 | Petoud et al. |
| 2010/0174047 A1 | 7/2010 | Jung et al. |
| 2010/0226991 A1 | 9/2010 | Horcajada-Cortes et al. |

FOREIGN PATENT DOCUMENTS

| WO | WO-2013-171659 A1 | 11/2013 |
| WO | WO-2016/028702 A1 | 2/2016 |
| WO | WO-2016/061256 A1 | 4/2016 |

OTHER PUBLICATIONS

Li, H. et al, Nature 1999, 402, 276-279 and 32 pages of supplementary material.*
Fang, Q.-R. et al, Angewandte Chemie International Edition 2007, 46, 6638-6642.*
Li, J. et al, International Journal of Hydrogen Energy 2009, 34, 1377-1382.*
Allendorf, M. D. et al, Chemical Society Reviews 2009, 38, 1330-1352.*
Yanai, N. et al, Nature Materials 2011, 10, 787-793 and 31 pages of Supplementary Material.*
Yan, D. et al, ChemPlusChem 2012, 77, 1112-1118.*
Shustova, N. B. et al, Journal of the American Chemical Society 2013, 135, 13326-13329.*
Hinterholzinger, F. M./ et al, Scientific Reports 2013, 3, paper 2562, 7 pages.*
Zhang, H.-T. et al, Chemical Communications 2014, 50, 12069-12072.*
Cho, W. et al, Journal of the American Chemical Society 2014, 136, 12201-12204.*
Guo, J. F. et al, RSC Advances 2015, 5, 46301-46306.*
Dietl, C. et al, Chemistry—A European Journal 2015, 21, 10714-10720.*
Lin, R.-B. et al, Inorganic Chemistry Frontiers 2015, 2, 1085-1090.*
Shen, X. et al, RSC Advances 2016, 6, 28165-28170.*
Kim, J. et al, Journal of the American Chemical Society 2001, 123, 8239-8247.*
Wan, Y. et al, Journal of Organic Chemistry 2002, 67, 6232-6235.*
Huang, L. et al, Microporous and Mesoporous Materials 2003, 58, 105-114.*
Sudik, A. C. et al, Journal of the American Chemical Society 2005, 127, 7110-7118.*
Fang, Q. et al, Inorganic Chemistry 2006, 45, 3582-3587.*
Sun, J. et al, Inorganic Chemistry 2006, 45, 8677-8684.*
Alvaro, M. et al, Chemistry a European Journal 2007, 13, 5106-5112.*
Fang, Q. et al, Crystal Growth & Design 2008, 8, 319-329.*
Cook, T. R. et al, Chemical Review 2013, 113, 734-777.*
Dikio, E. D. et al, Chemical Science Transactions 2013, 2, 1386-1394.*
Brinknnann, M. et al, Journal of the American Chemical Society 2000, 122, 5147-5157.*
Li, Z.-Q. et al, Inorganic Chemistry Communications 2008, 11, 1375-1377.*
Pichon, A. et al, CrystEngComm 2008, 10, 1839-1847.*
lnnaz, I. et al, Angewandte Chemie International Edition 2009, 48, 2325-2329.*
Muller, M. et al, Photochemical & Photobiological Sciences 2010, 9, 846-853.*
Kockrick, E. et al, Chemical Communications 2011, 47, 1562-1564.*

(Continued)

*Primary Examiner* — Arlen Soderquist
(74) *Attorney, Agent, or Firm* — Harness, Dickey & Pierce, P.L.C.

(57) ABSTRACT

A functional material includes a porous metal-organic framework (MOF) including an organic ligand derived from benzenedicarboxylic acid and a metal ion cluster coordination-bonded with the organic ligand, and a luminescent molecule in pores of the MOF.

17 Claims, 22 Drawing Sheets
(1 of 22 Drawing Sheet(s) Filed in Color)

(56) References Cited

OTHER PUBLICATIONS

Takashima, Y. et al, Nature Communications 2011, 2, paper 168, 8 pages with 21 pages of Supplementary Information.*
Ma, M. et al, CrystEngComm 2011, 13, 2828-2832 and 19 pages of Supplementary Information.*
Yuan, Y. et al, Materials Chemistry and Physics 2011, 131, 358-361.*
Yang, G.-S. et al, Journal of Materials Chemistry 2012, 22, 17947-17953.*
Lan, Y.-Q. et al, Inorganic Chemistry 2012, 51, 7484-7491 and 21 pages of Supplementary Information.*
Yu, J. et al, Angewandte Chemie International Edition 2012, 51, 10542-10545 and 11 pages of Supplementary Information.0.*
Grunker, R. et al, Chemistry A European Journal 2012, 18, 13299-13303 and 21 pages of Supporting Information.*
Carne-Sanchez, A. et al, Nature Chemistry 2013, 5, 203-211 and 30 pages of Supplementary Information.*
Wuttke, S. et al, Chemical Communications 2014, 50, 3599-3601.*
Dong, M.-J. Angewandte Chemie International Edition 2014, 53, 1575-1579 and 17 pages of Supporting Information.*
Nagarkar, S. S. et al, Chemistry An Asian Journal 2014, 9, 2358-2376.*
Yue, Y. et al, Dalton Transactions 2014, 43, 17893-17898 and 11 pages of Supporting Information.*
Zheng, J.-P. et al, ChemPlusChem 2016, 81, 758-763 and 6 pages of Supporting Information.*
Ryu, U. et al, Inorganic Chemistry 2017, 56, 12859-12865 and 22 pages of Supporting Information.*
Ryu, U. et al, Polyhedron 2018, 154, 275-294.*
Extended European Search Report dated Dec. 12, 2017 issued in corresponding European Application No. 17182074.9.
K. Paek et al., "Efficient Colorimetric pH Sensor Based on Responsive Polymer-Quantum Dot Integrated Graphene Oxide" Department of Chemical and Biomolecular Engineering, Korea Advanced Institute of Science and Technology(KAIST), vol. 8, No. 3, 2848-2856, (2014).
K. Wong et al, "A Highly Porous Luminescent Terbium-Organic Framework for Reversible Anion Sensing" Adv. Mater, 2006, p. 1051-1054.
B. Chen et al., "Luminescent Open Metal Sites within a Metal-Organic Framework for Sensing Small Molecules" Adv. Mater, 2007, p. 1693-1696.
O. Wolfbeis, "Sensor Paints" Adv. Mater. 2008, p. 3759-3763.
S. Kitagawa et al., "Functional Porous Corrdination Plymers" Ange. Chem. Int. Ed. 2004, 43, p. 2334-2375.
P. Shi et al., "Heterometal-organic frameworks as highly sensitive and highly selective luminescent probes to detect I' ions in aqueous solutions" Chem. Commun., 2015, 51, p. 3985-3988.
L. Wang et al., "Dynamically controlled one-pot synthesis of heterogeneous core-shell MOF single crystals using guest molecules" Chem. Commun., 2014, 50, p. 11653-11656.
X. Liu et al., "A luminescent metal-organic framework constructed using a tetraphenylethene-based ligand for sensing volatile organic compounds" Chem. Commun., 2015, 51, p. 1677-1680.
K. Sokolowshi et al., "Towards a New Family of Photoluminescent Organozinc 8-Hydroxyquinolinates with a High Propensity to Form Noncovalent Porous Materials" Chem. Eur. J. 2012,18, p. 5637-5645.
A. Prasanna De Silva et al., "Signaling Recognition Events with Flourescent Sensors and Switches" American Chemical Society, Rev. 1997, 97, p. 1515-1566.
J. Kido et al., "Organo Lanthanide Metal Complexes for Electroluminescent Materials" American Chemical Society, Rev. 2002, 102, p. 2357-2368.
K. Binnemans, "Lanthanide-Based Luminescent Hybrid Materials" American Chemical Society, Rev. 2009, 109, p. 4283-4374.
S. L. James, "Metal-organic frameworks" The Royal Society of Chemistry, 2003, 32, p. 276-288.
L. Basabe-Desmonts, "Design of flourescent materials for chemical sensing" The Royal Society of Chemistry, 2007, 36, p. 993-1017.
H. N. Kim et al., "Recent progress on polymer-based flourescent and colorimetric chemosensors" The Royal Society of Chemistry, 2011, 40, p. 79-93.
M. Zhu et al., "Blue flourescent emitters: design tactics and applications in organic light-emitting diodes" The Royal Society of Chemistry, 2013, 42, p. 4963-4976.
J. Askim et al., "Optical sensor arrays for chemical sensing: the optoelectronic nose" Chem. Soc. Rev., 2013; 42, p. 8649-8682.
S. Hirano et al, "Exposure, Metabolism, and Toxicity of Rare Earths and Related Compounds" Environmental Health Perspectives, 104, Mar. 1996, p. 85-95.
C. Hurst, "China's Rare Earth Elements Industry: What Can the West Learn?" Institute for the Analysis of Global Security, Mar. 2010.
P. Minoofar et al., "Placement and Characterization of Pairs of Luminescent Molecules in Spatially Separated Regions of Nanostructured Thin Film" J. Am. Chem Soc., 2002, 124, p. 14388-14396.
C. Wang et al., "Doping Metal-Organic Frameworks for Water Ocidation, Carbon Dioxide Reduction, and Organic Photocatalysis" J. Am. Chem. Soc. 2011, 133, p. 13445-13454.
S. Saha et al., "Photocatalytic Metal-Organic Framework from CdS Quantum Dot Incubated Luminescent Metalloydrogel" J. Am. Chem. Soc., 2014, 136, p. 14845-14851.
D. Feng et al., "A Highly Stable Porphyrinic Ziroconium Metal-Organic Framework with shp-a Topology" J. Am. Chem. Soc., 2014, 136, p. 17714-17717.
S. Hermes et al., "Loading of porous metal-organic open frameworks with organometallic CVD precursors: inclusion compounds of the type [LnM]a@MOF-5" J. Mater. Chem., 2006, 16, p. 2464-2472.
R. Ganesan et al., "Redox properties of bis(8-hydroxyquinoline)manganese(II) encapsulated in various zeolites" Journal of Molecular Catalysis A: Chemical 223 (2004) p. 21-29.
Y. Zhou et al., "Lantanides post-functionalized nanocrystalline metal-organic frameworks for turnable white-light emission and orthogonal multi-readout thermometry" Nanoscale, 2015, 7, p. 4063-4069.
J. Wang et al., "$Cu_2ZnSnS_4$ nanocrystals and graphene quantum dots for photovoltaics" Nanoscale, 2011, 3, p. 3040-3048.
A. Chaudhari et al., "Photonic hybrid crystals constructed from in situ host-guest nanoconfinement of a light-emitting complex in metal-organic framework pores" Nanoscale, 2016, 8, p. 6851-6859.
J. Yu et al., "Confinement of pyridinium hemicyanine dye within an anionic metal-organic framework for two-photon-pumped lasing" Nature Communications, Oct. 30, 2013.
S. Bureekaew et al., "One-dimensional imidazole aggregate in aluminium porous coordination polymers with high proton conductivity" Nature Materials, vol. 8, Oct. 2009.
R. H. Friend et al., "Electroluminescence in conjugated polymers" Nature, vol. 397, Jan. 14, 1999.
L. Pavesi et al., "Optical gain in silicon nanocrystals" Nature, vol. 408, Nov. 23, 2000, 440-444.
X. Dai et al., "Solution-processed, high-performance light-emitting diodes based on quantum dots" Nautre, vol. 515, Nov. 6, 2014.
D. Fujita et al., "Protein encapsulation within synthetic molecular hosts" Nature, Oct. 2, 2012.
S. Chui et al., "A Chemically Functionalizable Nanoporous Material $[Cu_3(TMA)_2(H_2O)_3]_n$," Science, vol. 283, Feb. 19, 1999.
H. Deng et al, "Multiple Functional Groups of Varying Ratios in Metal-Organic Frameworks" Science, vol. 327, Feb. 12, 2010.
A. Talin et al., "Tunable Electrical Conductivity in Metal-Organic Framework Thin-Film Devices" Science, vol. 343, Jan. 3, 2014.
P. Reiss et al., "Core/Shell Semiconductor Nanocrystals" small 2009, 5, No. 2, p. 154-168.
E. Biemmi et al., "Synthesis and characterization of a new metal organic framework structure with a 2D porous system: $(H_2NEt_2)_2[Zn_3(BDC)_4]$•3DEF" Solid State Sciences 8 2006) p. 363-370.
D. Tranchemontagne et al., "Room temperature synthesis of metal-organic frameworks: MOF-5, MOF-74, MOF-177, MOF-199, and IRMOF-0" tETRAHEDRON 64 (2008) 8553-8557.

(56) References Cited

OTHER PUBLICATIONS

Z. Pang et al., "Phosphorescent Oxygen Sensors Utilizing Sulfur-Nitrogen-Phosphorus Polymer Matrices" Adv. Mater. 1996, 8, No. 9.
G. Gustafsson et al., "Flexible light-emitting diodes made from soluble conducting polymers" Nature, vol. 357, Jun. 11, 1992.
D. Genna et al, "Heterogenization of Homogeneous Caralysts in Metal-Organic Frameworks via Cation Exchange" J. A. Chem. Soc., 2013, 135, p. 10586-10589.

* cited by examiner

FUNCTIONAL MATERIAL INCLUDING METAL-ORGANIC FRAMEWORK, METHOD OF PREPARING THE SAME, AND PHOTOCHEMICAL SENSOR INCLUDING THE SAME

CROSS-REFERENCE TO RELATED APPLICATIONS

This application claims priority under 35 U.S.C. § 119(a) from Korean Patent Application No. 10-2016-0092846 filed on Jul. 21, 2016, the disclosure of which is hereby incorporated by reference in its entirety.

BACKGROUND

1. Field

Example embodiments provide a functional material including a metal-organic framework (MOF), a method of preparing the same, and a photochemical sensor including the same.

2. Description of the Related Art

Optically active materials including luminescent materials have been the center of material research for a relatively wide range of sensing and lighting applications. Tunable chemico-physical properties play a crucial role in novel nanomaterials to control optical behavior and to achieve multi-stimuli sensing. Therefore, various kinds of materials including pure organic, hybrids, organic-inorganic, and purely inorganic materials with multiple chemical functionalities have been explored to construct highly sensitive and responsive sensors and energy-efficient lighting devices.

Although efficient materials are available in the market or reported in scientific literature, most of the contemporary chemical sensory materials are long-chain polymers or conjugated organic molecules which are complex and tedious to synthesize, and require a relatively high cost for industrial scale-up. Rare-earth complexes also require a relatively high cost for synthesis and they are considered to be hazardous to the environment.

Furthermore, due to limited reversibility for strongly interacting analytes, conventional sensor materials show diminishing sensitivity with repeated use, and changes in environmental condition such as temperature or humidity may affect the sensitivity of conventional sensors. Also, aggregation of organic molecules is softer (i.e., weaker interactions), leading to the self-photo bleaching of material which reduces the life of materials for use as a photochemical sensor.

In addition, most of the chemical sensors detect analytes which are reactive, and therefore there is limited scope for conventional sensors for use in detection of weakly interacting analytes or inert analytes. Further, probe solubility is the major concern in some of the heterogeneous sensors used for liquid-based sensing, and there is a danger of aging of a material surface in case of sensors made from polymers, which may change their detection limit and overall sensitivity.

Meanwhile, in order to apply a photochemical material for sensing and lighting devices, etc., metal-organic frameworks (MOFs) have been actively researched and reported. Metal-organic frameworks (MOFs) are an emerging class of nanoporous crystalline materials with many possibilities for tuning the chemistry and physical properties of hybrid materials, which are enabled by a plethora of chemical structures including organic and inorganic basic building blocks. Specifically, the hybrid framework of MOFs has long-range ordering (crystalline strong bonds) to confer regular arrays of nanosized voids of an active chemical environment, which may include open metal sites, anionic-cationic species, or free organic functional groups.

However, guest encapsulation and infiltration in MOF frameworks is difficult, if not nearly impossible, when the pore size of the MOF is relatively small, although they possess generally larger internal voids (e.g. ZIF-8—internal void dimension: >11 Å, entry pore aperture size: <3.4 Å). Therefore, most of the research in this field is concentrated on relatively small guest encapsulation with only a few exceptions of large guest encapsulation studies. Also, luminescent MOFs do not show intense emission properties unless they are made from rare-earth metal ions or long-chain conjugated organic linkers which are commercially expensive or tedious to synthesize.

In addition, conventional hydrothermal synthesis affords relatively large crystals of MOF (several tens to hundreds of microns), which reduces the overall sensitivity of a compound for sensing purposes as signal transduction becomes harder to visualize rapidly or to monitor reliably. Further, larger crystal size (several tens to hundreds of microns) also generates the possibility of uneven guest distribution in the network which may disturb the continuous array of a host-guest chemical environment available for response signal gain and a reliable detection lifetime.

Additionally, due to random and large size crystal growth of MOF compounds, they are difficult to fabricate in a thin-film form for device fabrication and thus limit the use of materials for large-area industrial applications and real-world commercialization. Furthermore, conventional guest encapsulation in MOF voids generally includes guests such as neutral species or small ionically charged species. To date, metal complexes as guest molecules for encapsulation within the MOF voids by in-situ methods have rarely been reported, because they may lead to multiple product formation where single pure product formation is difficult to reliably obtain.

SUMMARY

Example embodiments provide an inexpensive functional material which is relatively easily synthesized and suppresses photo-bleaching or concentration quenching and has improved luminescent characteristics and photochemical detectability; a method of preparing the same; and a sensor including the functional material and that is capable of detecting a trace amount of a relatively wide range of organic solvents and volatile organic compounds at a relatively high speed and having improved life-span characteristics and durability.

According to example embodiments, a functional material includes a porous metal-organic framework (MOF) including an organic ligand derived from benzenedicarboxylic acid and a metal ion cluster coordination-bonded with the organic ligand, and a luminescent molecule in pores of the MOF.

A metal of the metal ion cluster may be at least one selected from Li, Na, K, Rb, Be, Mg, Ca, Sr, Ba, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi.

The functional material may further include trialkylammonium ions in the pores of the MOF.

The MOF may exhibit main peaks at (200), (110), (002), (111), (202), and (112) planes in a powder X-ray diffraction (PXRD) analysis pattern.

The luminescent molecule may be a metal complex, and the metal complex may be one of an 8-hydroxyquinoline metal complex, a 2-methyl-8-hydroxyquinoline metal complex, a 7-n-propyl-8-hydroxyquinoline metal complex, a 10-hydroxybenzoquinoline metal complex, a hydroxyacridine metal complex, an azomethine metal complex, a 2-hydroxyphenyl benzothiazole metal complex, and a porphyrin metal complex. A metal of the metal complex may be at least one of Be, Mg, Ca, Sr, Ba, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi.

The luminescent molecule may be an organic molecule, and the organic molecule may be one of naphthalene, anthracene, fluorescein, pyrene, rhodamine, cyanine, quinine, coumarin, carbazole, and a derivative thereof.

The functional material may be a nanoparticle, and the nanoparticle may have an average particle diameter of about 1 nm to about 100 nm.

The functional material may emit light having a wavelength of about 100 nm to about 1000 nm.

The functional material may be a dispersion that is dispersed within a solvent, and the functional material may exhibit hypsochromic shifting as a pH of the solvent becomes lower; and bathochromic shifting as the pH of the solvent becomes higher.

The functional material may exhibit wavelength shifting by sensing one of an organic solvent and a volatile organic compound.

According to example embodiments, a method of preparing a functional material includes reacting a benzenedicarboxylic acid, a metal ion, a trialkylamine, and a luminescent molecule in a solvent to form the functional material including a porous MOF and a luminescent molecule in pores of the MOF, the MOF including an organic ligand derived from the benzenedicarboxylic acid and a metal ion cluster coordination-bonded with the organic ligand, and the solvent including one of N,N-dimethyl formamide (DMF), N,N-dimethyl acetamide (DMA), and a combination thereof.

The reacting may be performed by a rapid one-pot synthesis method at room temperature.

The reacting mixes the benzenedicarboxylic acid and the trialkylamine in the solvent, adds the luminescent molecule, and subsequently adds the metal ion thereto.

The mole ratio of the metal ion and the benzenedicarboxylic acid may range from about 1:1 to about 1:5.

The mole ratio of the benzenedicarboxylic acid and the trialkylamine may range from about 1:1 to about 1:5.

The mole ratio of the luminescent molecule and the benzenedicarboxylic acid may range from about 1:1 to about 1:20.

The functional material obtained when the solvent is N,N-dimethyl formamide (DMF) may emit light at a wavelength of about 400 nm to about 550 nm.

The functional material obtained when the solvent is N,N-dimethyl acetamide (DMA) may emit light at a wavelength of about 450 nm to about 600 nm.

According to example embodiments, a photochemical sensor includes the functional material, and is configured to sense one of an organic solvent and a volatile organic compound.

The one of the organic solvent and the volatile organic compound may be one of acetone, acetonitrile, benzene, chloroform, cyclohexane, dichloromethane, ethanol, methanol, propanol, dioxane, N,N-dimethyl acetamide, N,N-dimethyl formamide, hexane, isopropanol, toluene, tetrahydrofuran, and a combination thereof.

The functional material according to example embodiments is more easily synthesized and inexpensive, and suppresses photo-bleaching or concentration quenching and has improved luminescent characteristics and photochemical detecting performance. The photochemical sensor including the functional material may rapidly detect a trace amount of various organic solvents and volatile organic compounds and have improved life-span characteristics and durability.

BRIEF DESCRIPTION OF THE DRAWINGS

The patent or application file contains at least one drawing executed in color. Copies of this patent or patent application publication with color drawing(s) will be provided by the Office upon request and payment of the necessary fees.

The above and other advantages and features of this disclosure will become more apparent by describing example embodiments thereof in further detail with reference to the accompanying drawings, in which:

FIG. 10(a) shows a mixed solution of 1,4-benzenedicarboxylic acid and triethylamine, FIG. 10(b) shows a guest molecule of a ZnQ solution, FIG. 10(c) shows a mixed solution of solutions of (a) and (b), and FIG. 10(d) shows a final product solution obtained by adding a solution including Zn(II) ions into the solution of (c). The solvents in FIG. 10 (a) to (d) are all N,N-dimethyl formamide.

DETAILED DESCRIPTION

Figure 1:
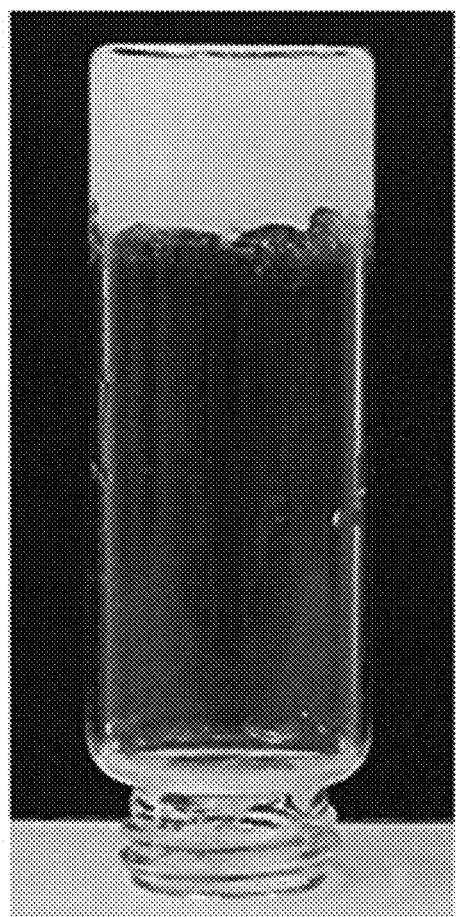
FIG. 1 is a photograph showing a gel-type hybrid material co-existing with a metal-organic framework (MOF), obtained in an N,N-dimethyl formamide (DMF) solvent according to example embodiments.

Example embodiments will hereinafter be described in detail, and may be easily performed by those who have common knowledge in the related art. However, this disclosure may be embodied in many different forms and is not construed as limited to the example embodiments set forth herein.

Hereinafter, the term "combination thereof" refers to a mixture, a stack, a complex, a copolymer, an alloy, a blend, a reaction product, etc. of constituents.

In example embodiments, a functional material includes a porous metal-organic framework (MOF) including an organic ligand derived from benzenedicarboxylic acid and a metal ion cluster coordination-bonded with the organic ligand, and a luminescent molecule in pores of the MOF.

The MOF may be a kind of host, and the luminescent molecule may be kind of guest confined in pores of the MOF. The functional material having the host-guest structure may have a nanoparticle form which is photochemically active and structurally stable, and exhibits luminescent characteristics. In addition, the functional material may be a self-assembly material which is crystalline and porous and has a hierarchical organic/inorganic fine structure.

The functional material which is a novel functional nano-size material may have the following effects.

Sensors can be made using an ultra-small concentration of the functional MOF nanomaterial, and typically <<1 mg is sufficient for effective photo-chemical detection.

The current system of the functional MOF compound offers multiple chemical interactions including non-covalent interactions such as H-bonding, π-π interactions, dipole-dipole interaction, and strong metal coordinating interaction in a single accessible site. Therefore, both strongly interacting molecules (e.g. DMF, methanol, or ethanol) and weakly interacting molecules (e.g. cyclohexane, hexane, isopropanol, or acetone) may be easily traced using this material.

Metal-coordination to confine light-emitting materials by analytes is reversible only in the protected shell of the MOF framework, and non-covalent interactions may be interrupted without damaging the overall integrity of the porous framework structure. This makes sensing totally reversible with good recovery of original optical properties.

Because the framework of the MOF is a highly ordered crystalline structure, it enables partitioning and separation of individual emissive guest molecules from adjacent guest molecules through a well-confined continuous 3-D array. This partitioning effect reduces or prevents phenomena such as photo-bleaching and concentration quenching which are commonly associated with self-aggregation of luminescent nanoparticles or luminescent complexes.

In the example of photo-chemical sensors, photoluminescent guest species may be kept protected from environmental degradation (e.g. sunlight irradiation, and temperature and humidity attack), as the MOF host offers shielding and stays stable up to about 200° C. and in humid conditions during winter or summer seasons.

The material synthesis route invented here is a high yield and very cost effective one (using commercially available small organic molecules: 1,4-benzenedicarboxylic acid and Zn(II) salt), and is extremely rapid (reaction time <1 min, processing time of about 2 h required for washing of material to remove excess reactants).

Analyte detection (as low as 2 μl concentration) is very rapid and can be visualized under UV light by the naked eye without the requirement of a spectrometer using a proof-of-principle solid paper device as well as in liquid suspension form. There is huge potential of combining such a strategy with a low-cost hand-held spectrophotometer to afford even lower concentration detection at sub-ppm levels.

The porous MOF material stays insoluble in almost all organic solvents and keeps confined emissive guest molecules stable within the functional MOF cavity, which are otherwise soluble in organic solvents.

Hereinafter, a functional material according to example embodiments is described.

An MOF, which is also called a metal-organic framework, is an organic-inorganic hybrid material in which the unit body with metal ions or a metal ion cluster coordination-bonded with an organic ligand (or organic linker) is regularly or irregularly arranged in one dimension, two dimensions, or three dimensions. The MOF included in the functional material according to example embodiments is a porous metal-organic framework including a unit body consisting of a metal ion cluster and an organic ligand derived from benzenedicarboxylic acid coordination-bonded with the same, wherein the unit body is arranged in three dimensions.

The benzenedicarboxylic acid may be, for example, 1,4-benzenedicarboxylic acid (terephthalic acid).

In the metal ion cluster, the metal may be an alkali metal, an alkaline-earth metal, a transition metal, a post-transition metal, or a semi-metal, and is specifically at least one selected from Li, Na, K, Rb, Be, Mg, Ca, Sr, Ba, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi. Among them, the metal may be, for example, Zn, Bi, Co, Ni, Cu, Cd, Al, Ga, or In.

The metal ion cluster is one in which metals or metal ions are gathered to form a given or predetermined structural unit. One example of the metal ion cluster may be $[Zn4O]^{6+}$, but is not limited thereto.

The MOF may include trialkylammonium cations in pores thereof. The trialkylammonium cations may act to neutralize a negative charge of the MOF. The trialkylammonium is estimated to have a hydrogen bond with an oxygen atom having a free negative charge in the organic ligand derived from benzenedicarboxylic acid. When the MOF includes trialkylammonium cations in the pores, the volume may be expanded due to strain generated from the cations. As the MOF accommodates the trialkylammonium cations in the pores, which are free cations for neutralizing the negative charge of the organic ligand, two chemical interactive regions are provided so as to detect the inflow of extraneous guest species.

The trialkylammonium may be represented by Chemical Formula 1.

[Chemical Formula 1]

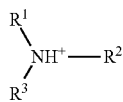

In Chemical Formula 1, $R^1$, $R^2$, and $R^3$ are the same or different, and are independently a C1 to C10 alkyl group, for example, a C1 to C5 alkyl group or a C1 to C3 alkyl group.

The trialkylammonium may be, for example, trimethylammonium or triethylammonium.

The MOF may be one exhibiting main peaks at (200), (110), (002), (111), (202), and (112) planes in the powder X-ray diffraction (PXRD) analysis pattern. Among them, the intensity of peak corresponding to the (111) plane.

The MOF may encapsulate even a luminescent molecule having a relatively large volume, and may maintain stability even after the encapsulation. In addition, the MOF has functions to provide strong non-covalent interactions with the surrounding chemical environment, so as to enable the photochemical detection and the photoelectron control.

The luminescent molecule, which is kind of guest confined in pores of the MOF, may include any molecules without limitation as long as the luminescence is monitored by naked eyes, or the luminescence is monitored by the naked eye under the ultraviolet (UV) radiation. The luminescent molecule is estimated to form a non-covalent interaction with the MOF in pores of the MOF.

The luminescent molecule may be, for example, a metal complex or an organic molecule.

The metal complex may be, for example, an 8-hydroxyquinoline metal complex, a 2-methyl-8-hydroxyquinoline metal complex, a 7-n-propyl-8-hydroxyquinoline metal complex, a 10-hydroxybenzoquinoline metal complex, a hydroxyacridine metal complex, an azomethine metal complex, a 2-hydroxyphenyl benzothiazole metal complex, or a porphyrin metal complex, but is not limited thereto.

In the metal complex, the metal may be at least one selected from Be, Mg, Ca, Sr, Ba, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi. Among them, the metal may be, for example, Be, Mg, Zn, or Al.

The luminescent metal complex may be, for example, an 8-hydroxyquinoline metal complex, for example a Zn-bis-(8-hydroxyquinoline), Be-bis-(8-hydroxyquinoline), Mg-bis-(8-hydroxyquinoline), Al-tris-(8-hydroxyquinoline), etc. Herein, the 8-hydroxyquinoline may be modified into 2-methyl-8-hydroxyquinoline or 7-n-propyl-8-hydroxyquinoline.

For another example, the luminescent metal complex may be a hydroxyquinoline metal complex, for example, Be-bis-(10-hydroxybenzo[h]quinoline), Zn-bis-(10-hydroxybenzo[h]quinoline), Zn-bis-(4-hydroxyacridine), etc.

For another example, the luminescent metal complex may be an azomethine metal complex, for example, a Zn-salicylidene-leucine complex, an Al-salicylidene-leucine complex, a Zn-salicylidene-amine complex, etc.

Additionally, the luminescent metal complex may be Zn-bis-(2-hydroxyphenyl benzothiazole) or Zn-porphyrin.

The luminescent molecule may be an organic molecule, and the organic molecule may be, for example, naphthalene, anthracene, fluorescein, pyrene, rhodamine, cyanine, quinine, coumarin, carbazole, or a derivative thereof. The derivative may be, for example, 9,10-diphenylanthracene, 9,10-bis-(phenylethynyl)anthracene, 1-chloro-9,10-bis-(phenylethynyl)anthracene, 2-methyl-9,10-di-(2-naphthyl) anthracene, fluorescein disodium, 1-pyrene carboxylic acid, 1-pyrene boronic acid, 7-diethylamino-4-methyl coumarin, 4,4'-N,N'-dicarbazole-biphenyl, poly(n-vinylcarbazole), etc., but is not limited thereto.

The functional material may have a nanoparticle form.

The nanoparticles may be gathered to each other to form a nanosheet, and furthermore, the nanosheets may be connected with each other to form a fibrous shape. The fiber formed by gathering nanoparticles may have a gel-like form.

The functional material may have a nanoparticle shape having a very uniform size. The nanoparticles may have an average particle diameter of about 1 nm to about 100 nm, for example, about 1 nm to about 80 nm, for example, about 1 nm to about 70 nm, for example, about 1 nm to about 60 nm, for example, about 1 nm to about 50 nm, or for example, about 1 nm to about 30 nm.

The functional material may emit light having various wavelengths according to a kind of the included luminescent molecule. For example, the functional material may emit light having a wavelength of about 100 nm to about 1000 nm, for example, about 200 nm to about 900 nm, for example, about 300 nm to about 800 nm, for example, about 400 nm to about 700 nm, or for example, about 400 nm to about 600 nm. The functional material may express light such as light blue, light green, light yellow, dark blue, dark green, dark yellow, or white.

The luminescent molecules may be maintained to be separated from each other by the MOF, so the self-aggregation of luminescent molecules may be suppressed, thus the phenomenon such as photo-bleaching or concentration quenching may be reduced or prevented. In addition, as the luminescent molecule is surrounded by the MOF, it may be protected from environmental influences of temperature, humidity, etc.

Another merit of the functional material is that it may be simply and rapidly synthesized at a low cost. Another embodiment provides a method of preparing the functional material.

The method of preparing the functional material may include reacting benzenedicarboxylic acid, metal ions, trialkylamine, and luminescent molecules in a solvent. Specifically, the preparation method may include mixing benzenedicarboxylic acid and trialkylamine in a solvent, adding luminescent molecules, and subsequently adding metal ions thereto. Herein the solvent is N,N-dimethyl formamide (DMF), N,N-dimethyl acetamide (DMA), or a combination thereof.

According to the preparation method, the functional material is prepared to have a structure in which the luminescent molecules are successfully encapsulated in pores of the MOF, and the functional material may accomplish the stable emission characteristics and the photochemical sensing ability.

The reactants including the solvent are easily available and inexpensive compounds. In addition, the preparation method may be performed at a rapid speed to complete the synthesis within 5 min, for example, 1 min, at room temperature, which is a one-pot or in-situ synthesis with a high yield without going through multiple steps. Therefore, the mass production is possible at a low cost. In addition, the synthesis products are easily separated to be directly applied to various applications such as a photochemical sensor, an electronic device, etc.

The method of preparing the functional material may be considered as a remarkably improved method, compared to the conventional method of synthesizing MOF at a low speed under the conditions of a high temperature or a high pressure or the conventional reaction of encapsulating a guest in the MOF.

In the preparation method, the benzenedicarboxylic acid may be, for example, 1,4-benzenedicarboxylic acid (terephthalic acid).

The metal ion may be present in a metal salt, and the metal may be, for example at least one selected from Li, Na, K, Rb, Be, Mg, Ca, Sr, Ba, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi. Among them, the metal may be, for example, Zn, Bi, Co, Ni, Cu, Cd, Al, Ga, or In.

The trialkylamine, which is an organic base, may act to deprotonize the benzenedicarboxylic acid and may act for gelling the product. The trialkylamine may exist as ammonium cations in pores of the MOF of the functional material, which is a product after the reaction.

The trialkylamine may be represented by Chemical Formula 2.

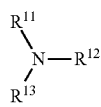

[Chemical Formula 2]

In Chemical Formula 2, $R^{11}$, $R^{12}$, and $R^{13}$ are the same or different, and are independently a C1 to C10 alkyl group, for example, a C1 to C5 alkyl group or a C1 to C3 alkyl group.

The trialkylamine may be, for example, trimethylamine or triethylamine.

The luminescent molecule is the same as described above.

The content ratio of the reactants, which is a content ratio of benzenedicarboxylic acid, metal ions, trialkylamine, and luminescent molecules, is not particularly limited, but may be appropriately adjusted according to goals of a person of ordinary skill in the art.

For example, the metal ions and the benzenedicarboxylic acid, which are components of the MOF, may be mixed in a mole ratio of about 1:1 to about 1:5, for example, about 1:1 to about 1:4, about 1:1 to about 1:3, etc. When mixing at the mole ratio, a stable MOF may be provided.

In addition, the mole ratio of benzenedicarboxylic acid and the trialkylamine may be about 1:1 to about 1:5, for example, about 1:1 to about 1:4, about 1:1 to about 1:3, etc. When mixing at the mole ratio, MOF may be synthesized at a very high speed, and a gel-state product may be obtained.

The mole ratio of the luminescent molecule and the benzenedicarboxylic acid may be specifically about 1:1 to about 1:20, for example, about 1:2 to about 1:15, or about 1:2 to about 1:10. That is, the guest molecule of the luminescent molecule may be used at a rate of about 0.05 mol to 1 mol, etc. with respect to 1 mol of the benzenedicarboxylic acid, but is not limited thereto. When the luminescent molecule is mixed within the range of the mole ratio, it may provide a functional material having improved emission characteristics and photochemical sensing ability. Meanwhile, it is also possible to control the bandgap of the functional material by adjusting a mole ratio of the luminescent molecule which is a concentration of the luminescent molecule loaded in pores of the MOF.

In the preparation method, in the case that the solvent is N,N-dimethyl formamide (DMF), the obtained functional material may emit light-blue light when observing by the naked eye under the ultraviolet (UV) radiation, for example, the functional material may emit light at a wavelength of about 400 nm to about 550 nm, or about 450 nm to about 500 nm. On the other hand, in the preparation method, in the case that the solvent is N,N-dimethyl acetamide (DMA), the obtained functional material may emit light-yellow light when observing by the naked eye under the ultraviolet (UV) radiation, and may emit light having a wavelength of, for example, about 450 nm to about 600 nm, or about 480 nm to about 550 nm.

The functional material may exist in a solid state, and it may be present in a dispersion dispersed in a solvent, so as to be applied for a wide range of usages. The functional material may be used in, for example, a sensor, a lighting device, an electronic device, a gas storage device, a fuel cell, etc. For example, the latent application fields of the functional material are as follows.

1. Rapid multi-responsive smart sensors for electronic-photochemical detection applications in both a solid state and liquid states.

2. Sub-ppm breath analyzer for detection of acetone applicable to non-invasive diabetes monitoring technology 3. Micro- and nano-sized light emitters and optical sensors for integration into microelectromechanical systems (MEMS) and MEMS devices, and microelectronics 4. Large-area thin film sensing surfaces and frequency-shifters for LED lighting and displays 5. Optical-pH sensors In example embodiments, a photochemical sensor includes the functional material. The photochemical sensor may sense various organic solvents and volatile organic compounds (VOCs).

When the functional material is dispersed in the various kinds of organic solvents, it non-covalently interacts with an organic solvent molecule to show the various emission responses. That is, the functional material shows the various wavelength shifting phenomena depending upon the kind of the contacted organic solvent, thus the emitted light change is easily sensed by the naked eye or sensed by the naked eye under the ultraviolet (UV) radiation. Thereby, the functional material may be used as a sensor configured to detect the various kinds of organic solvents.

In the organic solvent, the wavelength shifting of the functional sensor may occur in various forms, for example, hypsochromic shifting, bathochromic shifting, hypochromic shifting, hyperchromic shifting, etc., may occur.

In addition, the functional material is thinly coated on a substrate such as paper to be used as a sensor. Even if the functional material is exposed to the volatile organic compound, it may strongly or weakly non-covalently interact with the volatile organic compound to show the various emission responses. That is, the functional material shows the various wavelength shifting depending upon the kind of the contacted volatile organic compound, such that the change of luminescent characteristics may be easily detected by the naked eye or detected by the naked eye under the ultraviolet (UV) radiation. Thereby, the functional material may be used as a sensor to detect a volatile organic compound.

The organic solvent or the volatile organic compound may be, for example, acetone, acetonitrile, benzene, chloroform, cyclohexane, dichloromethane, ethanol, methanol, propanol, dioxane, N,N-dimethyl acetamide, N,N-dimethyl formamide, hexane, isopropanol, toluene, tetrahydrofuran, or a combination thereof, and may additionally be formaldehyde, xylene, ethylene, propylene, styrene, xylene, acetaldehyde, etc., but is not limited thereto.

After the wavelength shifting by exposing the functional material to the organic solvent or the volatile organic compound, the functional material is contacted to the solvent used for synthesizing the functional material, which is a DMF or DMA solvent, then it is reverted to the original wavelength again. Due to the stable reversibility, the functional material may be worked as a permanent sensor.

The photochemical sensor may show sufficient detecting properties even by including a very small amount of the functional material. For example, the sensor may include the functional material at about 0.01 mg to about 5 mg, for example, about 0.01 mg to about 4 mg, about 0.01 mg to about 3 mg, about 0.01 mg to about 2 mg, or about 0.01 mg to about 1 mg. The sensor may show an improved detecting property even when including the functional material at less than or equal to about 1 mg.

Furthermore, the photochemical sensor may rapidly detect the organic solvent or the volatile organic compound, which is an analyte, even in a very small amount.

The photochemical sensor may be a sensor for detecting, for example, acetone. When the photochemical sensor is exposed to acetone at less than or equal to about 2 μl (in a case of sensing), the wavelength is shifted to change the emitting light, and the change may be observed by the naked eye or observed by the naked eye under the ultraviolet (UV) radiation. In addition, after exposing the sensor to acetone, it is exposed to the solvent used for synthesizing the functional material, which is a DMF or DMA solvent, again, then it is reverted to the original wavelength again. Thus, the sensor may repeatedly sense acetone.

Hereinafter, the specific process of synthesizing the functional material according to example embodiments, the various photochemical analyses for the functional material, and the sensing properties of the functional material will be described. However, the following specific examples are to describe but not to limit the range of the present inventive concepts.

1. Rapid one-step synthesis of functional hybrid gel material co-existing with porous MOF nanoparticles A reaction of Zn(II) and 1,4-benzenedicarboxylc acid leads to the formation of a gel-like hybrid material (FIGS. 1 and 2) triggered by the use of the organic base triethylamine. Specifically, 6.0 mmol of triethylamine is added to a solution in which 3.0 mmol of 1,4-benzenedicarboxylic acid is mixed into 3 mL of an N-dimethyl formamide solvent and added with a solution in which 1.5 mmol of Zn(NO3)2 is mixed into 3 mL of an N-dimethyl formamide solvent to provide a product.

The organic base, triethylamine, plays dual roles of deprotonation of dicarboxylic acid and gelation of the molecular species, forming self-assembled microstructures. This reaction may be performed using two different solvents, namely N,N-dimethylformamide (DMF) and N,N-dimethylacetamide (DMA); other common polar solvents (methanol, ethanol, etc.) are incompatible due to the solubility problems of reactants. FIG. 1 shows a product obtained in the DMF solvent, and FIG. 2 shows a product obtained in the DMA solvent.

Figure 2:
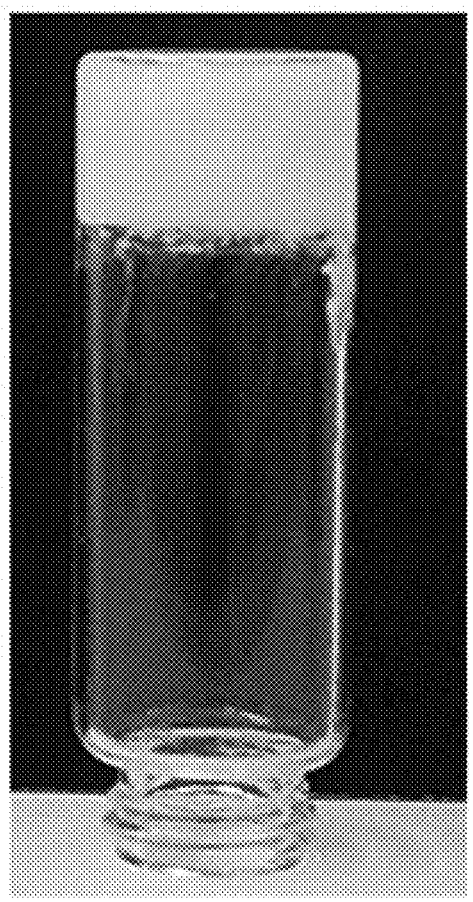
FIG. 2 is a photograph showing a gel-type hybrid material co-existing with an MOF, obtained in an N,N-dimethyl acetamide (DMA) solvent according to example embodiments.

A white color hybrid product behaves like a gel, which is confirmed by a gel inversion test depicted in FIGS. 1 and 2. The gel-like hybrid materials are obtained from fibrous materials, which are first generated between two layers of the reactant solutions, i.e., the upper layer of the ligand solution that contains triethylamine and 1,4-benzenedicarboxylic acid, and the bottom layer of the metal ion solution that contains $Zn(NO_3)_2$. Upon gradual shaking, the fibrous materials generated between the two layers start formation of thick fibres which eventually form gel-like hybrid materials in both solvent systems, i.e., N,N-dimethylformamide (DMF) and N,N-dimethylacetamide (DMA). Addition of an excess of methanol solvent to this hybrid yields a bulk amount of non-soluble white compound.

Figure 3:
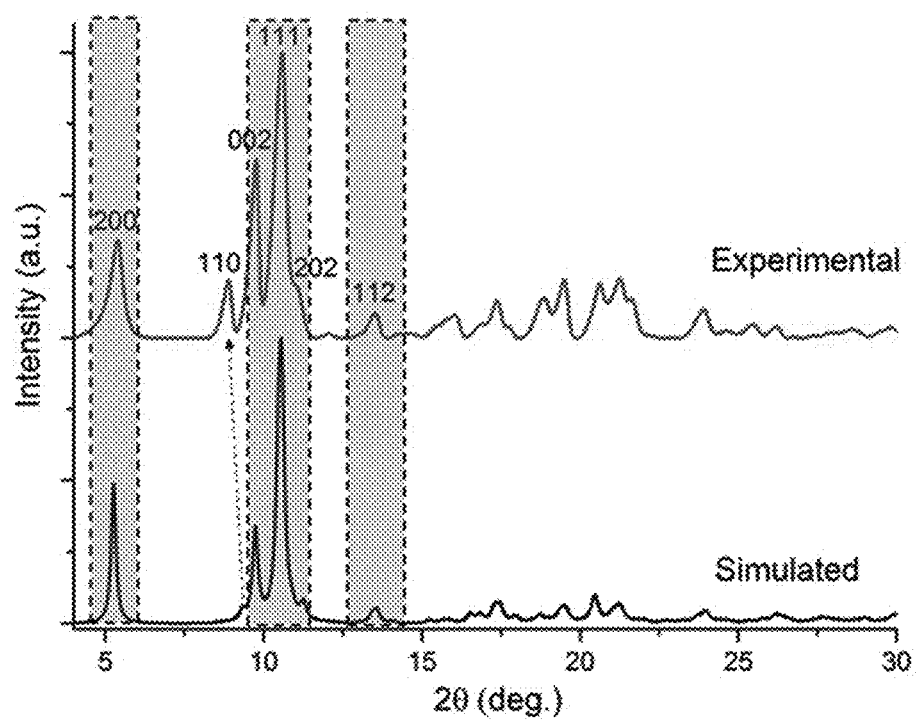
FIG. 3 is a powder X-ray diffraction (PXRD) analysis pattern for an MOF obtained according to example embodiments.

Detailed spectroscopic study on the obtained white solid powder reveals the process of formation of the metal-organic framework (MOF) integrated in the fibrous gel network. A powder X-ray diffraction (PXRD) pattern helps in understanding of the framework structure (FIG. 3), which shows similarity to the one reported in literature by Norbert Stock et al. (Solid State Sciences 2006, 8, 363-370). In FIG. 3, the lower pattern is a powder X-ray diffraction pattern of the simulation test, and the upper pattern is a pattern for the MOF obtained according to example embodiments. Referring to FIG. 3, presence of main Bragg peaks in the lower angle shows good agreement with simulated powder X-ray diffraction patterns of the reported structure. It has been confirmed that MOF crystals are oriented predominantly at the (111)-plane, thereby corresponding to the highest peak intensity.

Broadening of all peaks, and a shift in (110) and (002) peaks ascribed to nano-sized MOF particle formation with strain arising from the confined triethylammonium cations ($NEt_3$) inside the voids of the framework, may lead to expansion of the structure volume (FIG. 3).

Figure 4:
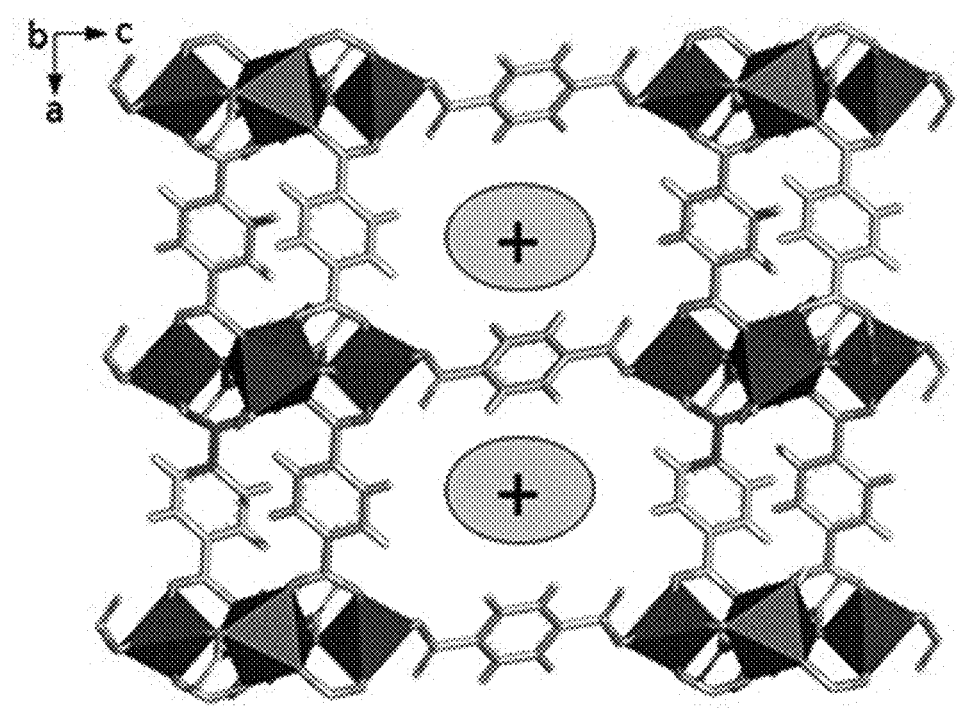
FIG. 4 is a schematic view showing a structure of an MOF according to example embodiments, which is a packing diagram along a b-axis in which metal oxo clusters having a Td-Oh-Td coordination of Zn(II) are connected by 1,4-benzenedicarboxylic acid to form an active pore having an uncoordinated COO-group and extra framework cations.
Figure 5:
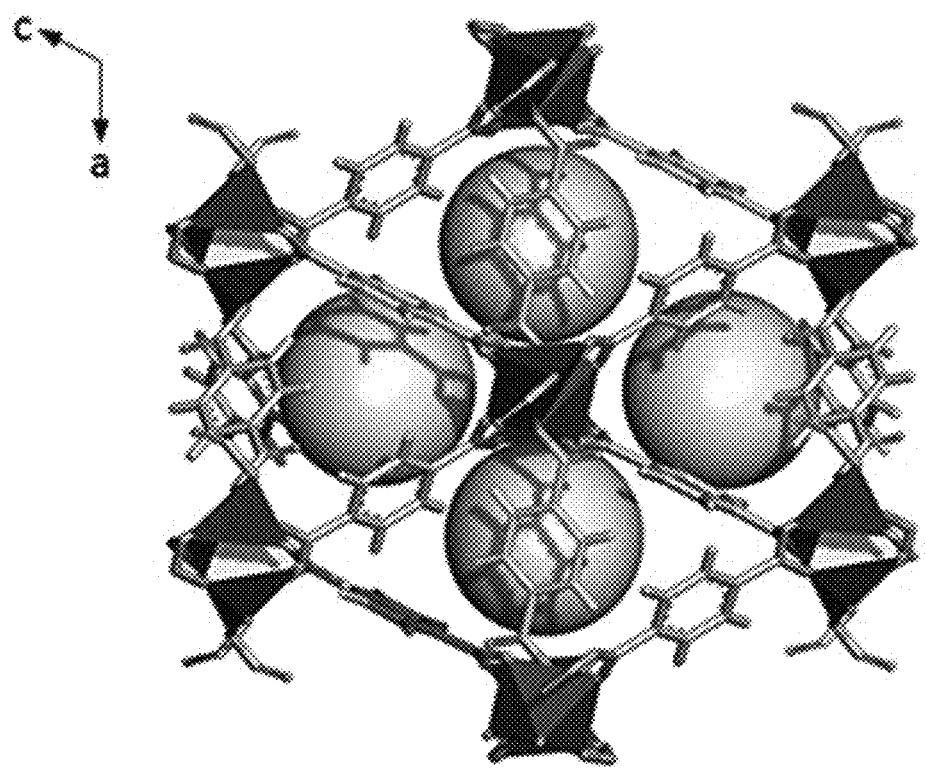
FIG. 5 shows a packing diagram along an ac diagonal axis showing an MOF structure according to example embodiments with a void space and a triangular channel.

The structure of the MOF contains two types of Zn(II) coordination environment, that is, octahedral and tetrahedral sites, which lead to the formation of a metal-oxo cluster bridged by benzenedicarboxylic acid (BDC) linkers, that ultimately helps porous void formation within 3D MOF structures (FIGS. 4 and 5). Particularly, the voids are very active in the sense that free cations sitting within the voids to neutralize the negative charge of uncoordinated benzenedicarboxylic acid (BDC) linker sites offer two sites of interaction for incoming foreign guest species.

Figure 6:
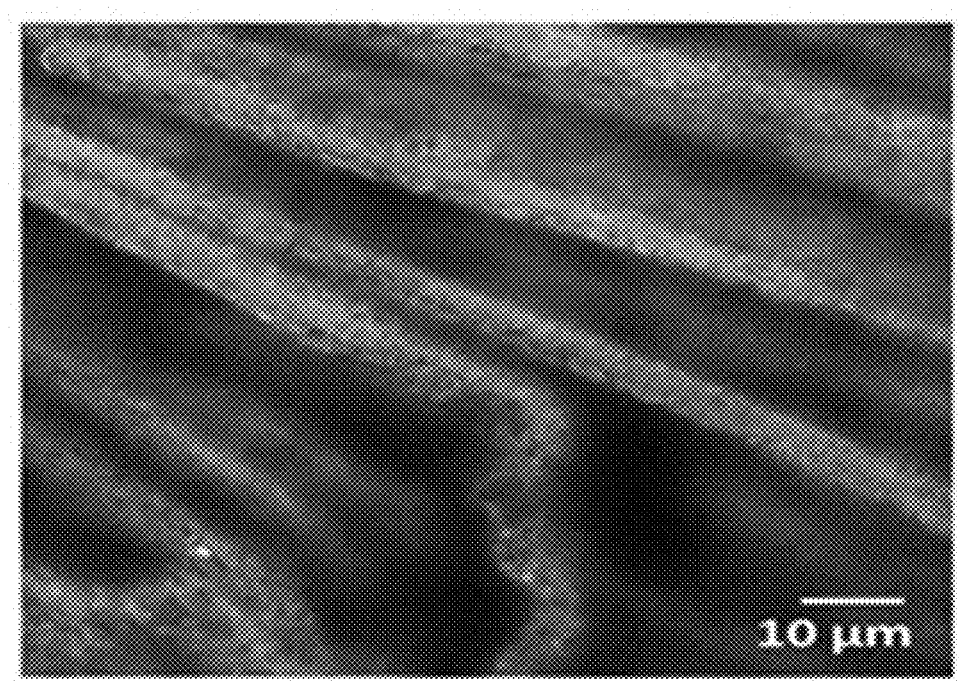
FIG. 6 is an optical microscopic image showing a fibrous hybrid material including an MOF prepared in example embodiments.

2. Controlled nanostructural features of the hybrid gel material and extraction of MOF nanoparticles Detailed investigation using scanning electron microscopy (SEM), transmission electron microscopy (TEM), atomic force microscopy (AFM), and optical microscopy on a hybrid material help to analyze a sequence of material formation and its main microstructural features. Use of a high concentration of reactants triggers formation of fibrous networks, which subsequently forms a partially crystalline fibrous hybrid material. Optical images of stable materials give the hint of two-step transition. FIG. 6 is an optical microscope photograph showing a soft fiber material forming intact fibers containing a crystalline material with shiny surfaces.

Figure 7:
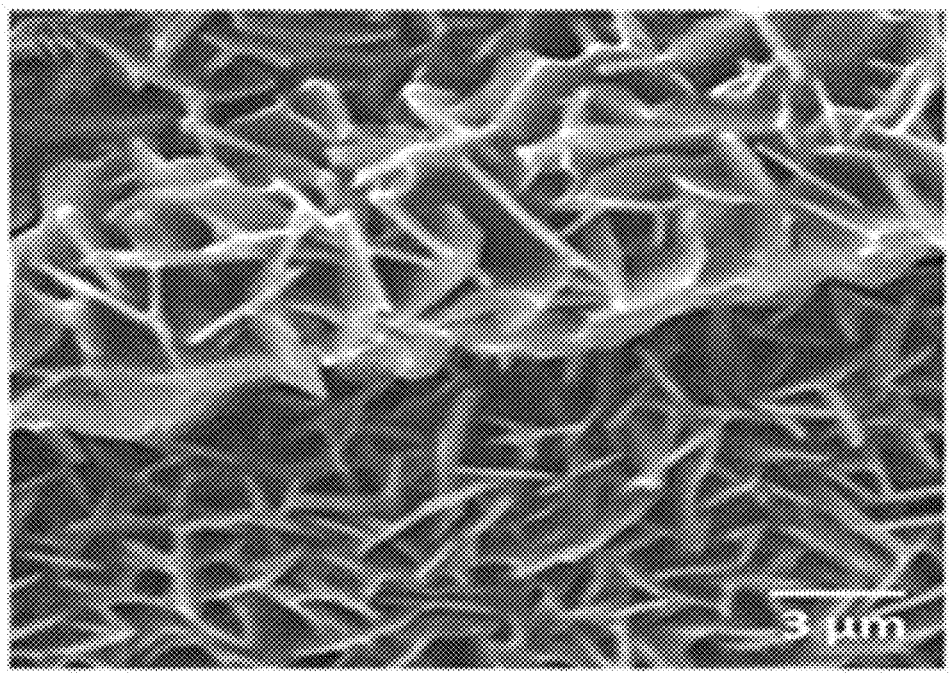
FIG. 7 is a scanning electron microscopic image showing a fibrous hybrid material including an MOF prepared in example embodiments.

Transition of a soft material where a hybrid material turns into a partially crystalline version is very rapid and difficult to monitor in order to capture SEM or optical images, but formation of fibers from stable partially crystalline hybrid materials may be traced. The fiber size ranges from a few microns to 10 microns in diameter. Interestingly, SEM images show that partially crystalline hybrid materials consist of crystalline nano-sheets connected or bound together via fibers (FIG. 7).

Two major differences are observed in the morphology of products when reactants are treated together in layer form and in bulk quantities. Reaction of bulk amount of reactants yields a hybrid material containing deformed single crystals of few micron sizes fragmented into polycrystalline form constituting nano-sheets. These deformed single crystals are connected together by fibers passing through them. Highly concentrated fiber formation disrupts the complete formation of single crystal but results in partially connected nanosheets as a non-integrated part of the hybrid crystal.

Figure 8:
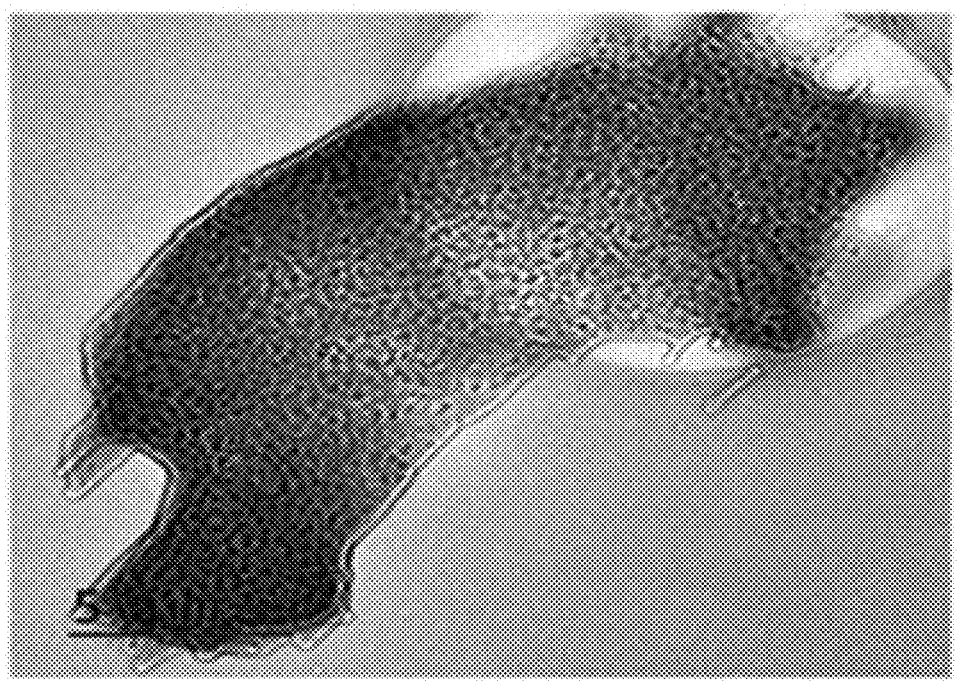
FIG. 8 is a transmission electron microscopic image showing a nanosheet including an MOF prepared in example embodiments.

On the other hand, well grown nanosheets are noticed from the reaction of layered reactants on a glass surface without any sign of deformed crystal formation. Further understanding of these nanosheets reveals that each nanosheet is built from small nano-particles of the size of about 20 nm (FIG. 8).

Figure 9:
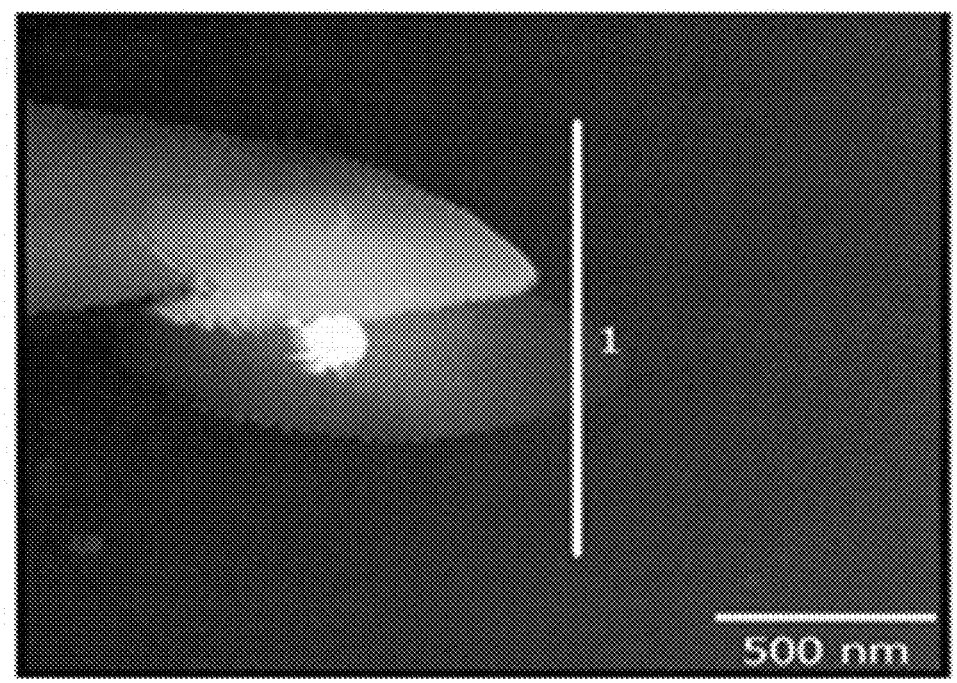
FIG. 9 is an atomic force microscopic image showing a nanosheet including an MOF prepared in example embodiments.

Extraction and purification of nanosheets from a fibrous material and PXRD diffraction on a bulk amount of samples clearly indicate that nanosheets containing nano-particles are nothing but an extended network of an MOF. Referring to images of FIGS. 8 and 9, a thickness of each nanosheet is about 20 nm at a minimum. From the results, it is suggested that the nanosheet is a single layer of nano-MOF nanoparticles (20 nm) connected together.

3. Functionalization of hybrid material to create functional MOF host-luminescent guest active compounds Spontaneous formation of a hybrid material and evolution of an MOF framework material from the fibrous material allows the confinement of guest species in the hybrid material or eventually within the voids of the porous MOF. The present inventors demonstrated the successful encapsulation of Zn-bis-(8-hydoxyquinoline) complex (hereinafter referred to as ZnQ) in the MOF compound with high rate product formation and tunable pore loading. Hereinafter, the final product encapsulating a luminescent compound in pores of the MOF is referred to a functional material.

In an experiment, careful mixing of a solution of guest species with an organic linker solution before allowing that to mix with a metal ion solution gives a functionalized hybrid material in the final product. Specifically, 3.0 mmol of 1,4-benzenedicarboxylic acid and 6.0 mmol of triethylamine are added and mixed into 3 mL of DMF solvent (FIG. 10 (a)); a ZnQ solution (FIG. 10 (b)) in which 0.5 mmol of $Zn(NO_3)_2$ and 1.0 mmol of 8-hydroxyquzoline are mixed into 1 mL of DMF is added thereto (FIG. 10 (c)); and a solution in which 1.5 mmol of $Zn(NO_3)_2$ is mixed into 3 mL of DMF is added thereto (FIG. 10 (d)) to provide a final product. The test is also separately performed using a DMA solvent instead of the DMF solvent.

Figure 10:
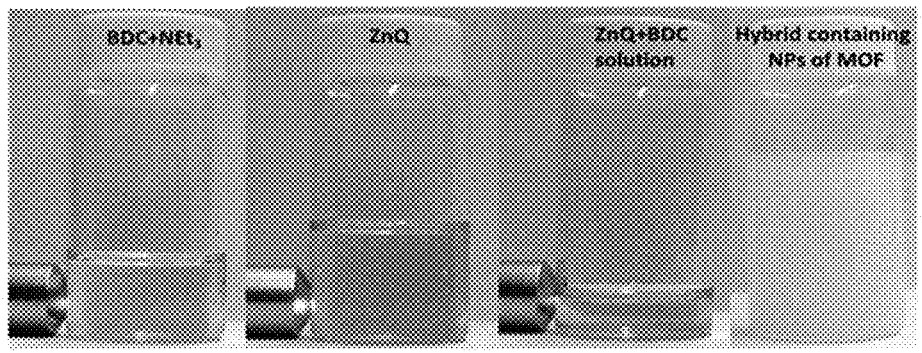
FIGS. 10(a)-10(d) are image showing reactants and a product of functional material according to example embodiments.

Herein, it is confirmed that a ZnQ solution and an organic linker benzenedicarboxylic acid solution stay stable without formation of any suspended particles evidenced by absence of any Tyndall scattering of the solution mixture (FIG. 10).

Obtained MOF products encapsulating emissive guests display enhanced emission properties compared with non-emissive hybrid materials without luminescent guests. Additionally, interestingly, two different products synthesized in DMF and DMA solvents emit at two different wavelengths although all parameters and chemical reactants are kept exactly the same in these reactions. Products obtained in the DMF solvent emit bluish green light around 470 nm with a quantum yield (QY) of about 25%, while the product obtained from the DMA solvent system emits greenish yellow at 510 nm with a QY of about 15%.

Figure 11:
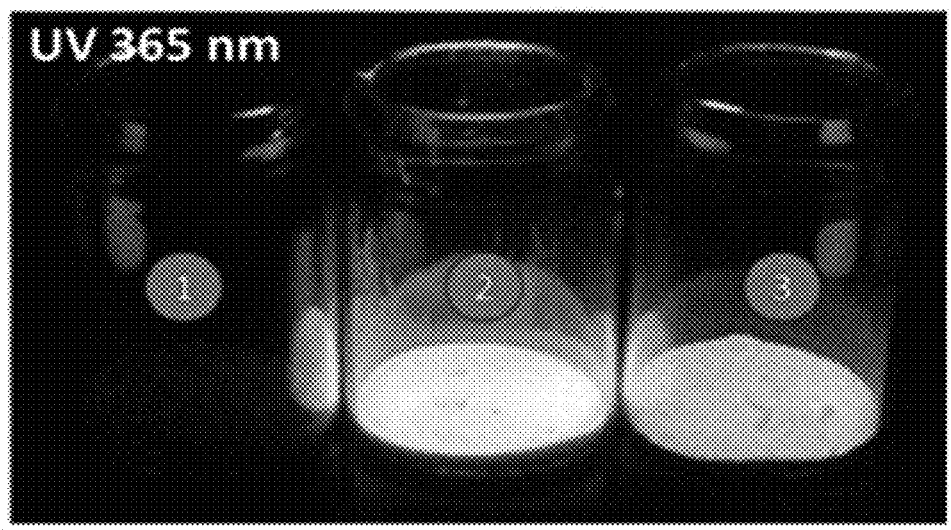
FIG. 11 is a photograph showing irradiation of ultraviolet (UV) for the functional material obtained in example embodiments, wherein No. 1 shows an MOF host with no guest, No. 2 shows the functional material synthesized in a DMF solvent, and No. 3 shows the functional material synthesized in a DMA solvent.

FIG. 11 is a photograph showing irradiation of the crystalline powder product by irradiating ultraviolet (UV) at 365 nm. Referring to FIG. 11, there are differences between the emission behavior of three compounds, namely the host framework without a guest (negligibly emission), one synthesized in the DMF solvent (light blue emission), and the third compound made in the DMA solvent (light yellow emission).

Figure 12:
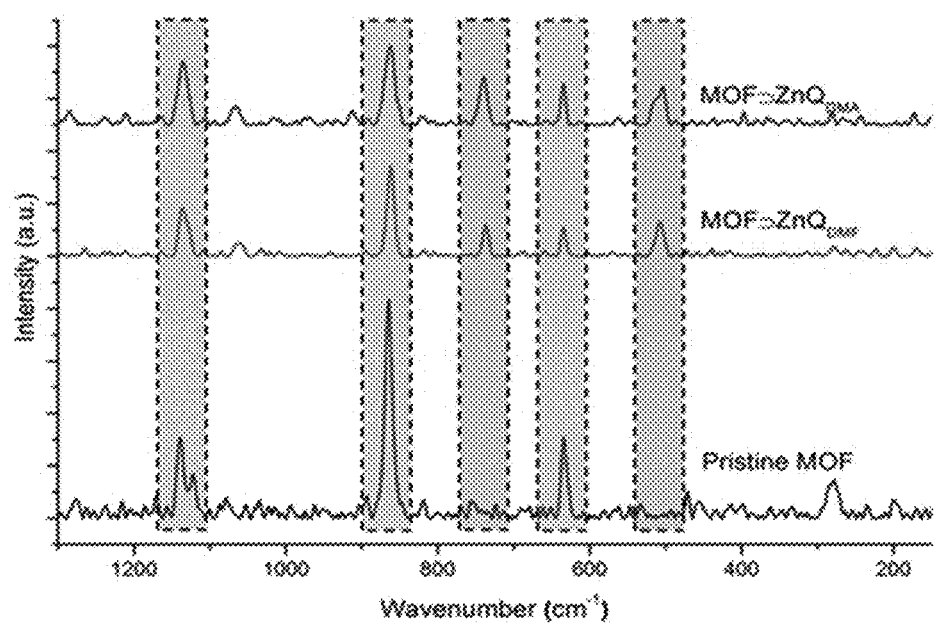
FIG. 12 shows Raman spectrums for the functional material obtained in example embodiments, which are an MOF host with no guest, a functional material synthesized in a DMF solvent, and a functional material synthesized in a DMA solvent, sequentially from the bottom.

Matching peak positions of the functional hybrid material that is a final product with a parent MOF in Raman spectra (FIG. 12) indicate the intact framework formation with confined guest species in MOF pores. A key to formation of the functional host-guest couple is the stability of a monomeric ZnQ complex in the DMF solvent and its ability to facilitate strong non-covalent interactions to its chemical environment surroundings. MOF nanoparticle formation integrating in-situ ZnQ guest confinement is confirmed by means of systematic spectroscopic studies, which is discussed in the following sections.

4. Tuneable emission of host-guest active materials in liquid dispersion and in solid state Due to differences in coordination tendencies and non-covalent interactions among DMF and DMA solvents, there may be two different ways of producing luminescent guest confinement (ZnQ). Bulkier DMA may be easily displaced from a coordination center of Zn in a ZnQ complex when a hybrid forms, which may lead to the open Zn sites for weak/strong interaction with donor atoms from the host framework (MOF). On the contrary, DMF can promote intramolecular H-bonding within the ZnQ monomeric complex while simultaneously keeping strong coordination to the Zn center. Additionally, a tendency of DMF molecules to make non-covalent interactions by terminal hydrogen atoms may keep ZnQ species well separated and protected from weak interactions of the framework active site, i.e., an un-coordinated carboxylic acid and cationic trimethylammonium site. Therefore the inventors hypothesize that a hypsochromic shift in the emission spectrum of functional hybrid obtained in the DMF system arise from the little distortion in the complex and complete isolation from weak interactions coming from chemical surroundings of the framework side.

Strong evidence for formation of a monomeric ZnQ complex and its confinement within a framework is emission of the hybrid material that matches to the emission of a monomeric ZnQ complex (about 500 nm; 20 nm less in compound MOF $\supset$ ZnQ$_{DMF}$ and 12 nm more in compound MOF $\supset$ ZnQ$_{DMA}$, wherein MOF $\supset$ ZnQ$_{DMF}$ means that a functional material has a structure wherein ZnQ guests are confined in pores of an MOF host prepared in a DMF solvent). Except for monomeric ZnQ species, other oligomeric/polymeric forms of ZnQ emit at a higher wavelength (>530 nm). Hence, the availability of confined volume and stability of the ZnQ monomer in a DMF solvent leads to the stable formation of a host-guest monomeric ZnQ confined MOF compound with a blue shift in its optical property.

Figure 13:
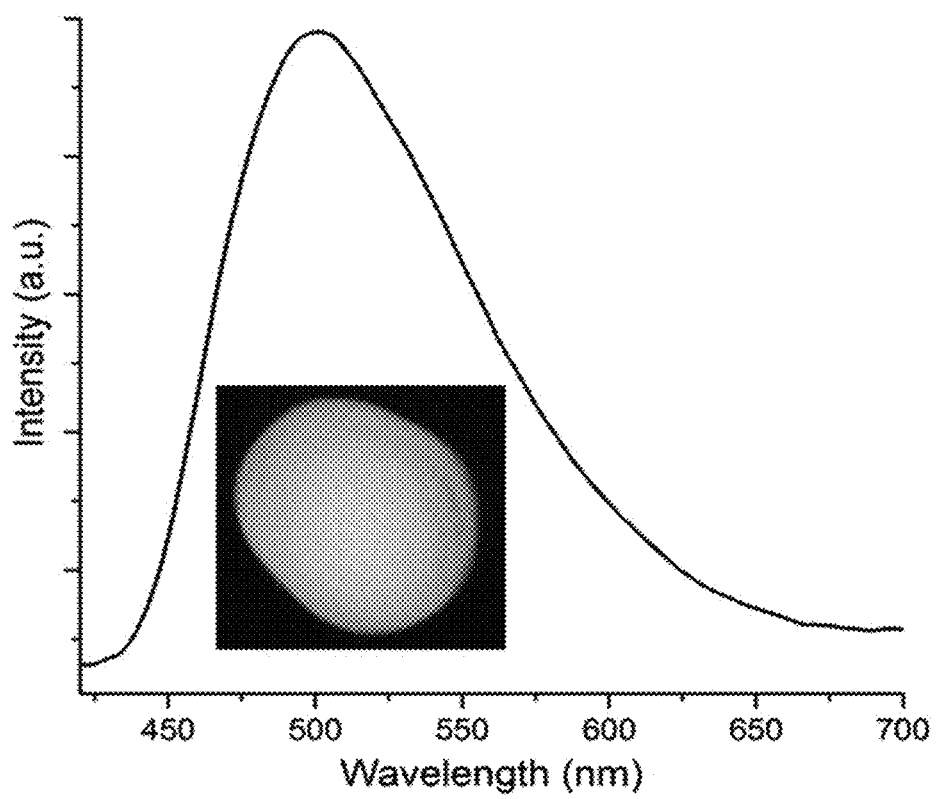
FIG. 13 is a photograph of pure solid-state ZnQ under the ultraviolet (UV) radiation, and a graph showing the emission characteristics.
Figure 14:
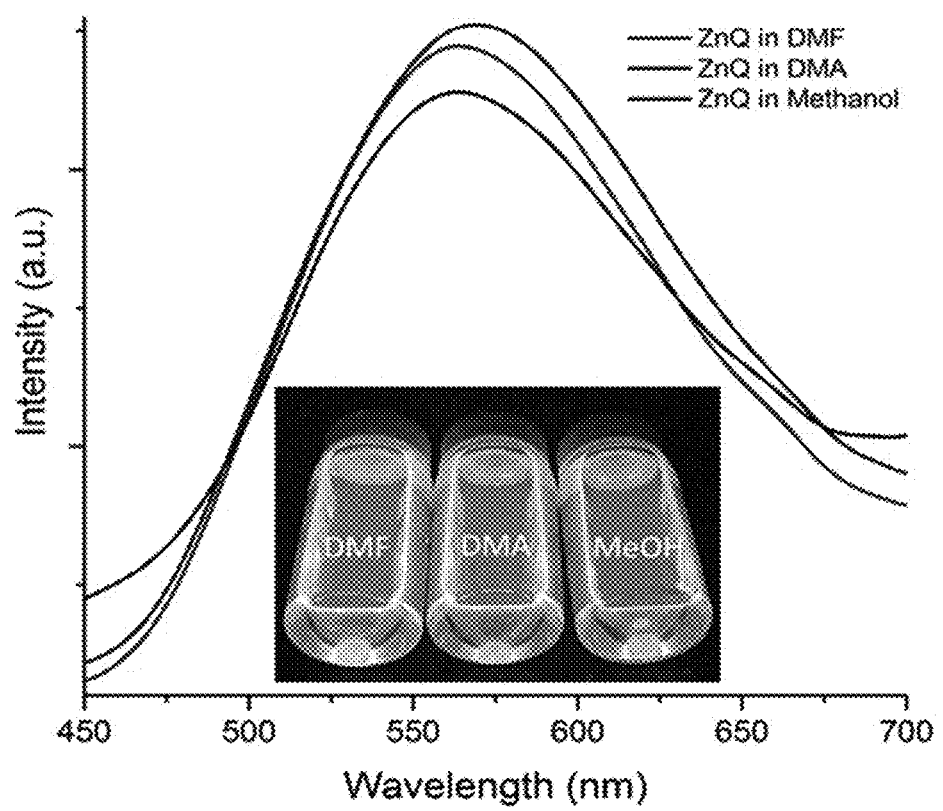
FIG. 14 is a photograph of ZnQ dispersed in DMF, DMA, and methanol, sequentially from the left, and a graph showing the emission characteristics.

An important observation on emission behavior of pure ZnQ compounds in both the solid state and liquid state gives an idea about the plausible molecular events taking place in a hybrid MOF compound. In a solid state, pure ZnQ emits at around 500 nm (FIG. 13), however when the same compound is suspended in DMF, DMA, and methanol, it exhibits a bathochromic shift in the emission following constant intensity (FIG. 14). These emission characteristics are distinguished from the emission characteristic of the functional material.

Figure 15:
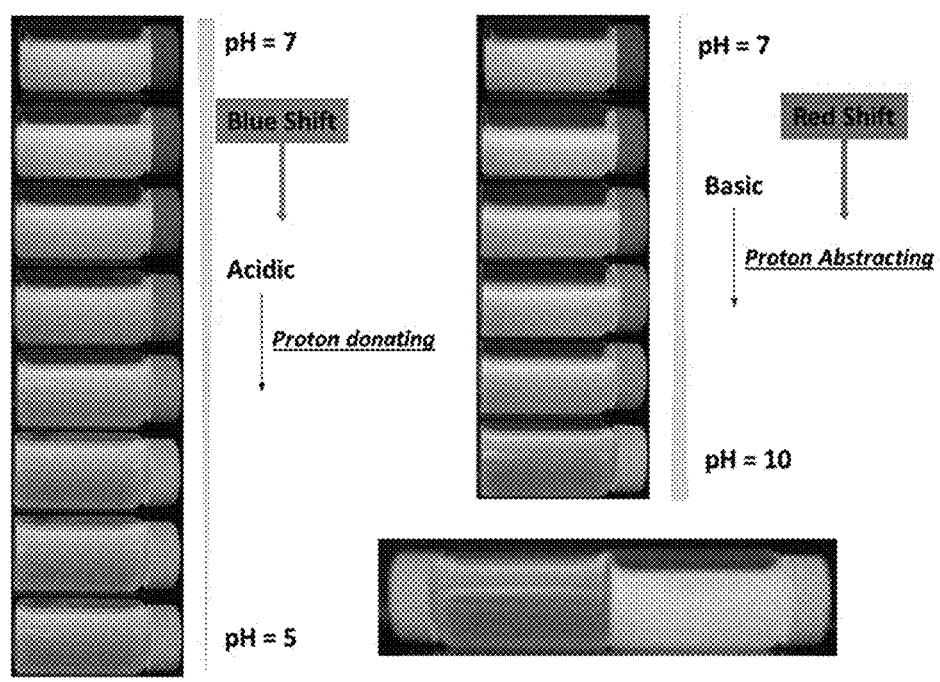
FIG. 15 is a view showing the emission characteristic change of functional material depending upon pH change of the solvent in the solvent dispersion of a functional material obtained in example embodiments.

In addition, the functional material dispersion exhibits various emission characteristics depending on pH (FIG. 15). pH changes of the functional material dispersion induce the change in emission characteristics by exhibiting a hypsochromic shift in acidic pH while having a bathochromic shift in neutral pH, which suggests a novel multi-functionality response of a material. Particularly, wavelength shifts may originate from molecular overlapping to form strong aromatic π-π and H-bond interactions in a solution state, unlike constrained molecular overlapping in the solid state. Thereby, it can be understood that the functional material according to example embodiments is applicable to a sensor for distinguishing a pH-dependent chemical environment.

Figure 16:
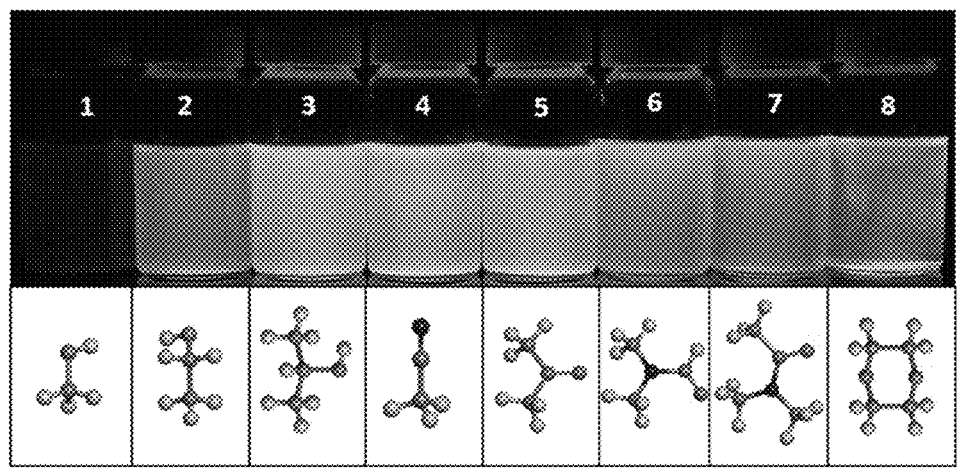
FIGS. 16(a)-(c) show results of observing the emission characteristic change of the dispersion in which the functional material obtained in a DMF solvent according to example embodiments is dispersed in the various solvents, FIG, 16(a) is a test tube image of the solvents used in a total of 8 dispersions, which are methanol, ethanol, isopropanol, acetonitrile, acetone, DMF, DMA, and dioxane, sequentially from the left, FIG. 16 (b) is an emission characteristic profile of each dispersion showing hypsochromic shifting, bathochromic shifting, hypochromic shifting, hyperchromic, shifting, etc., and FIG. 16 (c) is a chromaticity plot (CIE 1931) expressing emission color coordinates of each dispersion.
Figure 16:
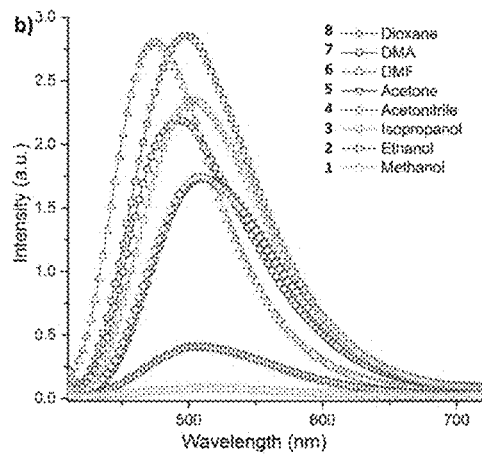
Figure 16:
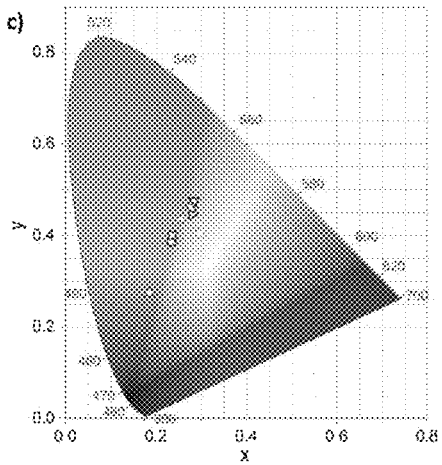
Figure 17:
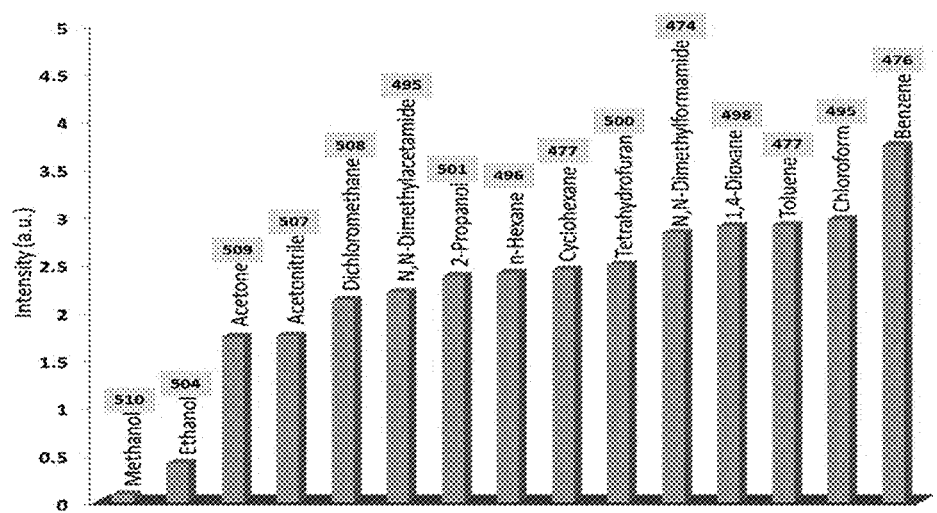
FIG. 17 is a graph comparing fluorescence luminance intensity of dispersions in which the functional material according to example embodiments obtained in a DMF solvent is dispersed in the various solvents, wherein the number indicated above the bars means an emission wavelength (nm).

A weak interaction dependent emission response may be used to further distinguish between a series of solvents or volatile organic compounds (VOCs) which offer various interactions. FIGS. 16 and 17 show variations in the emission behavior and intensities of different solvent dispersions having the same amount of active functional materials (dispersion of 5 mg of the functional material in 15 mL of solvent). Among the group of small aliphatic alcohol guest molecules, methanol shows diminishing fluorescence intensity within 3-4 min while 2-propanol shows an intense emission at 501 nm. Aliphatic long-chain alkanes (e.g. n-hexane) and cyclic alkanes (e.g. cyclohexane) exhibit interesting features: they show similar fluorescence intensity but at different wavelengths. This difference possibly arises due to the easy molecular mobility of linear n-hexane to enter MOF pores compared to the relatively bulkier cyclohexane molecule. Moreover, molecular-size dependent emission may also be explained for an aromatic compound pair of benzene and toluene. A dispersion with bulkier toluene exhibits less intensity, while that of benzene shows the highest increase in emission compared to toluene and to the rest of the solvent guest species tested. Similarly for another pair of solvents, dichloromethane (DCM) and chloroform, the smaller sized DCM can easily penetrate through the MOF pore and decrease the fluorescence intensity due to its electron withdrawing ability. Not much change, however, is observed for the pair of tetrahydrofuran and 1,4-dioxane. It is discovered that key solvent parameters, namely polarity, molecular volume, hydrogen bond donor and acceptor ability, and non-covalent interaction ability, all play important roles for inducing various emission properties, thus making the active material powerful for application as a VOC detection and recognition agent.

5. Disposable emissive paper device as a photochemical sensor for acetone and other volatile organic compounds (VOCs)

Taking into account the stimulation of active material triggered by solvent species, a proof-of-concept paper-based device containing a thin layer of functional hybrid material is developed, which shows fast and reproducible response to solvents, especially acetone with a high bathochromic shift. The paper device can be fabricated by drop coating a very small amount (about 2 µL concentration was tested, but a much lower level should be feasible) of active material dispersed in a solvent (e.g. hexane) onto a Whatman filter paper. Because the solvent is highly volatile, the device is immediately ready to use after room temperature drying for about 5 min.

Figure 18:
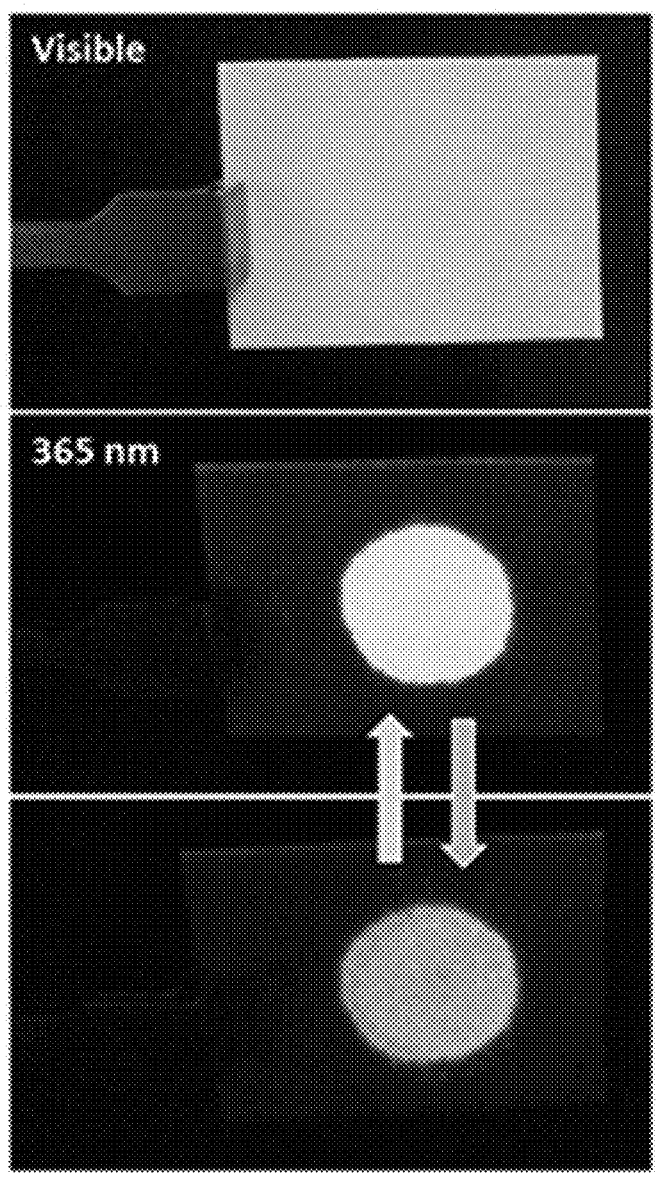
FIG. 18 illustrates images showing that the functional material has a reversible sensing ability to acetone in a paper device coated with the functional material according to example embodiments.
Figure 19:
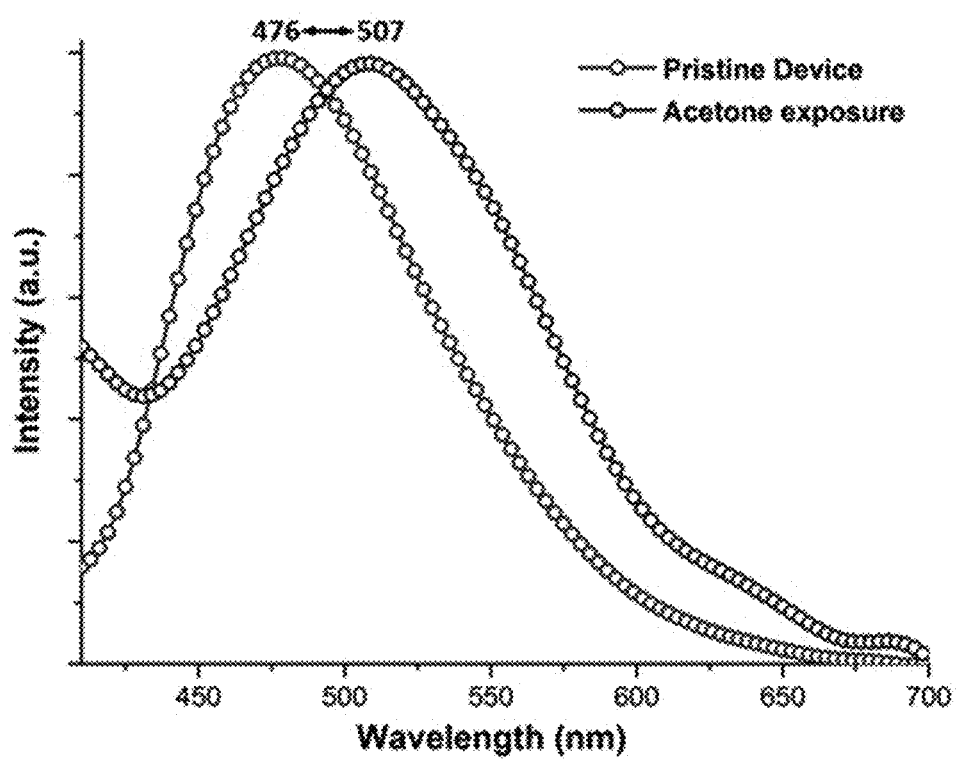
FIG. 19 is a graph showing that bathochromic shifting of around 30 nm is found when exposing a paper device coated with a functional material according to example embodiments to acetone, and it reverts to the original wavelength when exposing the same to DMF.

Exposure of a minute concentration of acetone to this paper device shifts emission by about 30 nm to a higher wavelength which is easily perceptible by the naked eye when the paper device is irradiated by 365 nm UV light. Importantly, this change may be reverted back to a lower wavelength by exposing the device to a DMF solvent for just a few minutes (about 3 to about 5 min, FIGS. 18 and 19).

Few key observations in emission on exposure to DMF solvent suggests the plausible mechanism taking place in tuneable photochemical sensing ability of this material. The moment active material is exposed to DMF, emission becomes more greenish yellow for a very short time, and then it slowly starts to show a hypsochromic shift and reverts back to emission at around 475 nm. It is suggested that weak interactions of the ZnQ guest with framework sites start to slowly dissipate by the entry of the foreign DMF solvent. Initially the foreign guest DMF can coordinate with the surface exposed ZnQ molecules, which shows transient greenish yellow emission. Slow penetration of the DMF guest through the pockets of framework pores can isolate ZnQ from surrounding weak interactions in a stepwise fashion, and finally presents emission with a hypsochromic shift.

The immediate response to acetone exposure by exhibiting higher wavelength emission can be explained by considering the molecular size of both solvents. Amongst the two solvents, acetone has a surface volume of 63.146 Å$^2$ vs. DMF at 75.187 Å$^2$. It is clear that acetone can easily penetrate through the pores due to a smaller size and disrupt DMF-framework weak interactions pushing ZnQ molecules to form interactions with the framework which derives emission at a higher wavelength.

Moreover, a bathochromic shift in the functional material is observed by heating the compound at 120° C. or applying high vacuum for a few hours. This thermal stimulus is in good agreement with the mechanism suggesting that thermal energy could facilitate the formation of weak interactions between the MOF and the ZnQ guest by removing the solvent guest from framework pores.

6. Entirely new series of functional materials created by employing the proposed host-guest synthetic strategy The synthetic method of the functional material may be extended to other systems containing other metal ions which are potentially useful for emission properties, e.g. In(III), Ga(III), etc. Because the BDC linker is a strongly coordinating linker in its deprotonated form, its reaction with a series of metal ions will lead to the formation of extended frameworks with confinement of functional luminescent guests within the voids.

Figure 20:
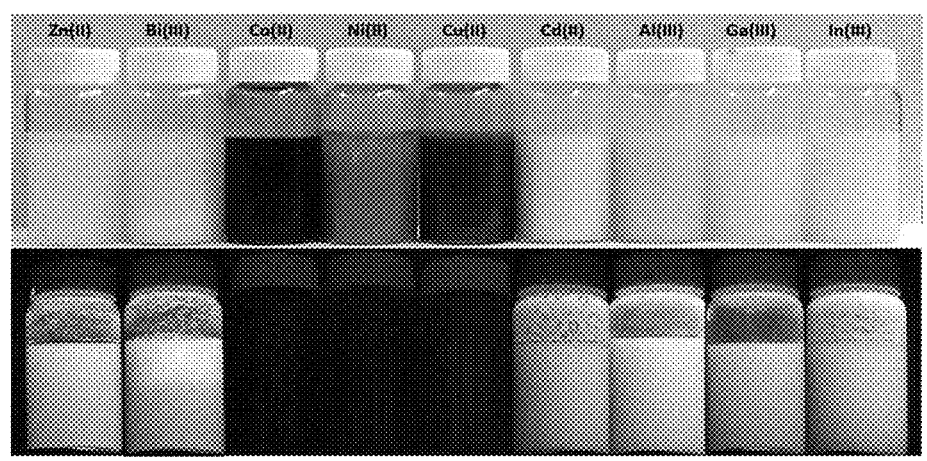
FIG. 20 shows photographs of functional materials according to example embodiments obtained by employing a wide range of metal ions while using the same organic ligand (1,4-benzenedicarboxylic acid) and the same luminescent molecule (ZnQ). The metal ion employed in each test tube is Zn(II), Bi(III), Co(II), Ni(II), Cu(II), Cd(II), Al(III), Ga(III), and In(III), sequentially from the left in the upper and lower photographs.

FIG. 20 shows functional materials made from various metal ions by keeping the same coordinating organic linker and luminescent guest ZnQ species. Resulting hybrids exhibited different emissions with varying intensities and wavelengths. Those containing Cu(II), Co(II), or Ni(II) show quenching of luminescence, while a system with Ga(III) shows dark yellow emission unlike the light green-white emission from Cd(II) or Al(III), or light yellow from systems containing Zn(II) or Bi(III).

7. Guest variation and easy formation of hybrid of MOF with guest-confined material Unlike the conventional method of guest encapsulation from hydrothermal synthesis which does not allow the confinement of larger sized guest species, the simple room-temperature method and in situ process of this disclosure allows the synthesis of hybrid organic-inorganic materials containing an MOF framework with encapsulated guest species or guest species as a central core of the framework nanoparticles.

Figure 21:
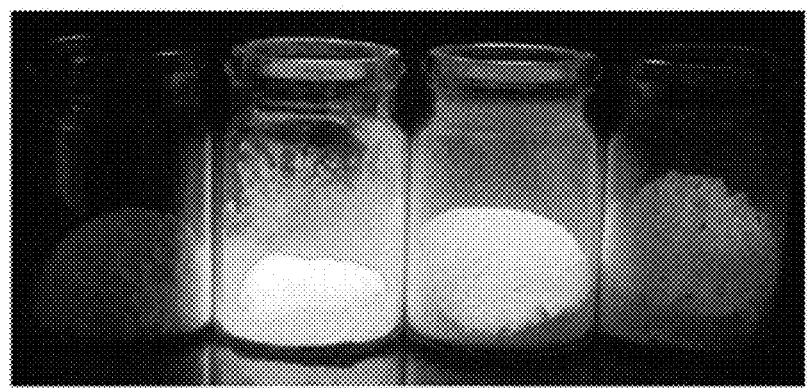
FIG. 21 shows a photograph of the functional materials obtained by employing the various luminescent molecules according to example embodiments. The luminescent molecules applied to each test tube in the upper part of are FIG. 21 are sequentially anthracene, fluorescein, an AlQ complex, and a ZnQ complex from the left side.
Figure 22A:
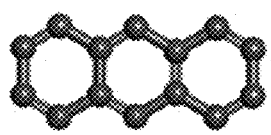
FIGS. 22A-D shows model molecular structures of anthracene (FIG. 22A), fluorescein (FIG. 22B), an AlQ complex (FIG. 22C), and a ZnQ complex (FIG. 22D).
Figure 22B:
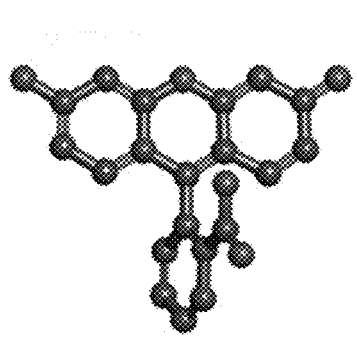
Figure 22C:
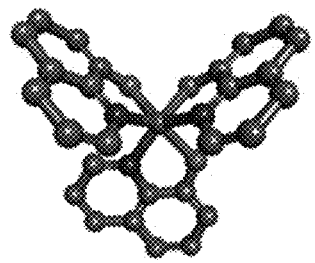
Figure 22D:
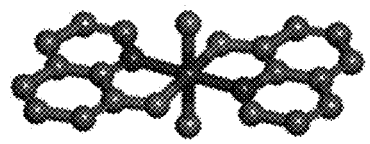

After successful hybrid formation using ZnQ as a guest for induced emission on the overall framework of the MOF material, as shown in FIG. 21, the integration of other organic-based guests is successfully achieved, i.e., with naphthalene, anthracene, fluorescein, as well as the inorganic complex Al-(tris-8-hydroxyquinoline) [AlQ], to generate corresponding host-guest active systems.

While this disclosure has been described in connection with what is presently considered to be practical example embodiments, it is to be understood that the inventive concepts are not limited to the disclosed embodiments, but, on the contrary, is intended to cover various modifications and equivalent arrangements included within the spirit and scope of the appended claims.

What is claimed is:

1. A functional material comprising:
   a porous metal-organic framework (MOF) including an organic ligand derived from benzenedicarboxylic acid, and a metal ion cluster coordination-bonded with the organic ligand; and
   a luminescent molecule confined in the pore of the MOF,
   wherein the functional material further comprises a trialkylammonium ion present in the pore of the MOF,
   wherein the MOF is a nanoparticle, and
   wherein the functional material comprises nanosheets connected together via fibers, and a nanosheet is a single layer of the MOF nanoparticles.

2. The functional material of claim 1, wherein a metal of the metal ion cluster is at least one of Be, Mg, Ca, Sr, Ba, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi.

3. The functional material of claim 1, wherein the MOF exhibits main peaks at (200), (110), (002), (111), (202), and (112) planes in a powder X-ray diffraction (PXRD) analysis pattern.

4. The functional material of claim 1, wherein
   the luminescent molecule is a metal complex,
   the metal complex is one of an 8-hydroxyquinoline metal complex, a 2-methyl- 8-hydroxyquinoline metal complex, a 7-n-propyl-8-hydroxyquinoline metal complex, a 10-hydroxybenzoquinoline metal complex, a hydroxyacridine metal complex, an azomethine metal complex, a 2-hydroxyphenyl benzothiazole metal complex, and a porphyrin metal complex, and
   a metal of the metal complex is at least one of Be, Mg, Ca, Sr, Ba, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi.

5. The functional material of claim 1, wherein
   the luminescent molecule is an organic molecule, and
   the organic molecule is one of naphthalene, anthracene, fluorescein, pyrene, rhodamine, cyanine, quinine, coumarin, carbazole, and a derivative thereof.

6. The functional material of claim 1, wherein the functional material emits light having a wavelength of about 100 nm to about 1000 nm.

7. The functional material of claim 1, wherein
   the functional material is a dispersion that is dispersed within a solvent, and
   the functional material exhibits hypsochromic shifting as a pH of the solvent becomes lower and bathochromic shifting as the pH of the solvent becomes higher.

8. The functional material of claim 1, wherein the functional material exhibits wavelength shifting by sensing one of an organic solvent and a volatile organic compound.

9. A photochemical sensor comprising the functional material of claim 1, the photochemical sensor configured to sense one of an organic solvent and a volatile organic compound.

10. The photochemical sensor of claim 9, wherein the one of the organic solvent and the volatile organic compound is one of acetone, acetonitrile, benzene, chloroform, cyclohexane, dichloromethane, ethanol, methanol, propanol, dioxane, N,N-dimethyl acetamide, N,N-dimethyl formamide, hexane, isopropanol, toluene, tetrahydrofuran, and a combination thereof.

11. A method of preparing a functional material, the method comprising:
   reacting a benzenedicarboxylic acid, a metal ion, a trialkylamine, and a luminescent molecule in a solvent to form the functional material including a porous metal-organic framework (MOF) and the luminescent molecule confined in the pore of the MOF, the MOF including an organic ligand derived from the benzenedicarboxylic acid and a metal ion cluster coordination-bonded with the organic ligand, and the solvent including one of N,N-dimethyl formamide (DMF), N,N-dimethyl acetamide (DMA), and a combination thereof;
   wherein the reacting mixes the benzenedicarboxylic acid and the trialkylamine in the solvent, adds the luminescent molecule, and subsequently adds the metal ion thereto, and
   wherein the MOF is a nanoparticle, and the functional material comprises nanosheets connected together via fibers, and a nanosheet is a single layer of the MOF nanoparticles.

12. The method of claim 11, wherein the reacting is performed at room temperature.

13. The method of claim 11, wherein the metal ion and the benzenedicarboxylic acid have a mole ratio of about 1:1 to about 1:5.

14. The method of claim 11, wherein the benzenedicarboxylic acid and the trialkylamine have a mole ratio of about 1:1 to about 1:5.

15. The method of claim 11, wherein the luminescent molecule and the benzenedicarboxylic acid have a mole ratio of about 1:1 to about 1:20.

16. The method of claim 11, wherein the solvent is N,N-dimethyl formamide (DMF), and the obtained functional material emits light at a wavelength of about 400 nm to about 550 nm.

17. The method of claim 11, wherein the solvent is N,N-dimethyl acetamide (DMA), and the obtained functional material emits light at a wavelength of about 450 nm to about 600 nm.

* * * * *